United States Patent
Yamazaki et al.

(10) Patent No.: US 9,332,521 B2
(45) Date of Patent: May 3, 2016

(54) STORAGE MEDIUM HAVING STORED THEREIN COMMUNICATION PROGRAM, INFORMATION PROCESSING APPARATUS, COMMUNICATION TERMINAL APPARATUS, COMMUNICATION SYSTEM, AND COMMUNICATION METHOD

(71) Applicant: NINTENDO CO., LTD., Kyoto (JP)

(72) Inventors: Masatoshi Yamazaki, Kyoto (JP); Taisuke Kawahara, Kyoto (JP); Yusuke Inoue, Kyoto (JP); Masaki Hara, Kyoto (JP); Kei Yasuda, Kyoto (JP); Masayoshi Matsuoka, Kyoto (JP); Yoshinobu Sato, Kyoto (JP); Hiroshi Adachi, Kyoto (JP); Takashi Kubota, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 148 days.

(21) Appl. No.: 14/155,947

(22) Filed: Jan. 15, 2014

(65) Prior Publication Data

US 2015/0029934 A1    Jan. 29, 2015

(30) Foreign Application Priority Data

Jul. 25, 2013   (JP) ................... 2013-154550

(51) Int. Cl.
*A63F 13/12* (2006.01)
*H04W 64/00* (2009.01)
*G01S 5/02* (2010.01)

(52) U.S. Cl.
CPC . *H04W 64/00* (2013.01); *G01S 5/02* (2013.01)

(58) Field of Classification Search
CPC .................. A63F 2300/1025; A63F 13/12
See application file for complete search history.

(56) References Cited

U.S. PATENT DOCUMENTS 8,366,548 B2   2/2013   Haruki et al.
2013/0150089 A1   6/2013   Kuwahara et al.

FOREIGN PATENT DOCUMENTS

JP   2013-122629   6/2013

*Primary Examiner* — Omkar Deodhar
(74) *Attorney, Agent, or Firm* — Nixon & Vanderhye P.C.

(57) ABSTRACT

Access from a communication terminal apparatus is received, and identification information that enables identification of a position of a communication terminal apparatus from which the access has been received and transmission data are acquired from the communication terminal apparatus, and are stored in a storage unit. Then, if access has been received from a communication terminal apparatus next and thereafter, the transmission data stored in the storage unit is transmitted to the communication terminal apparatus on the basis of identification information that enables identification of a position of the communication terminal apparatus.

23 Claims, 12 Drawing Sheets

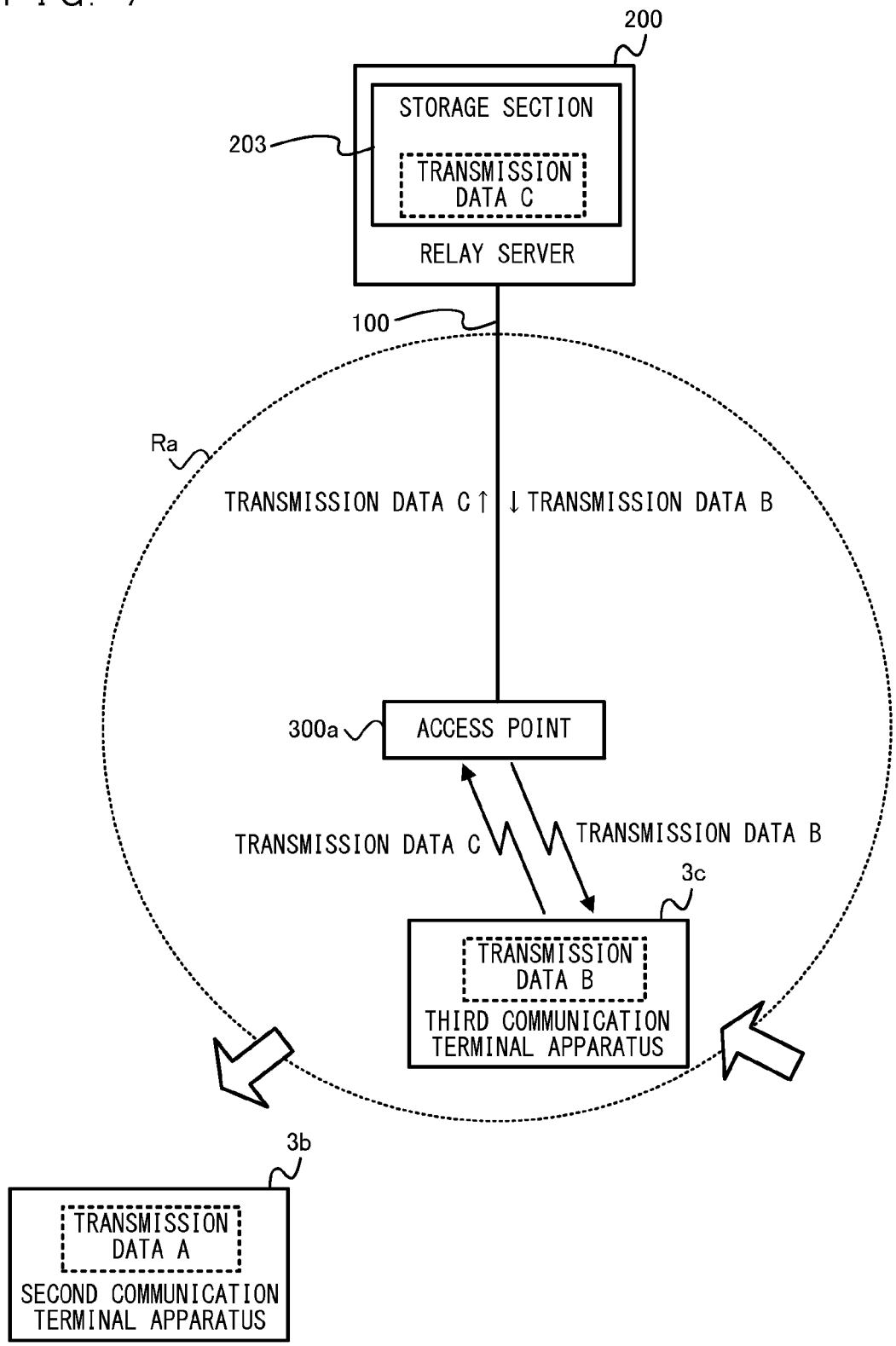
F I G. 7

F I G. 9
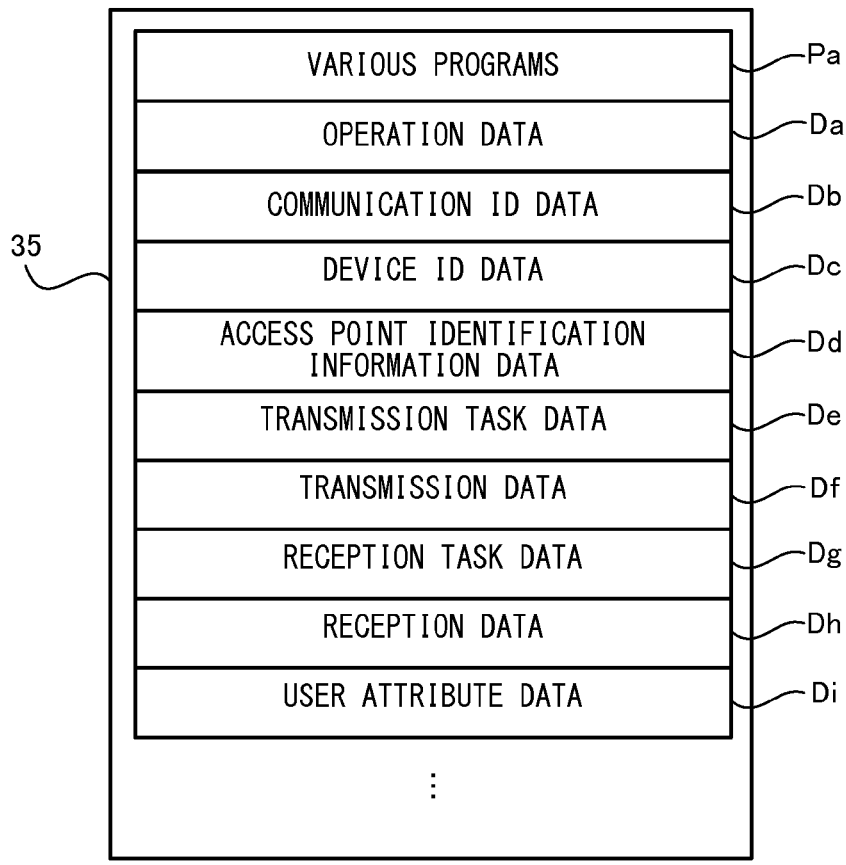
F I G. 10
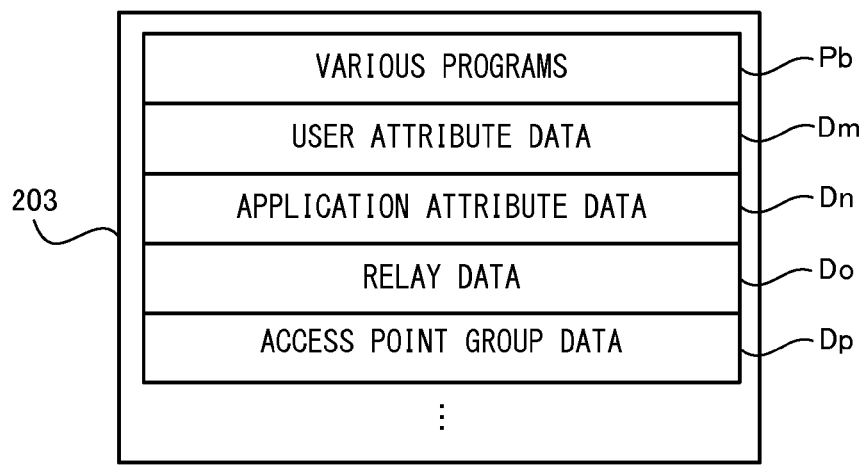

F I G. 1 1
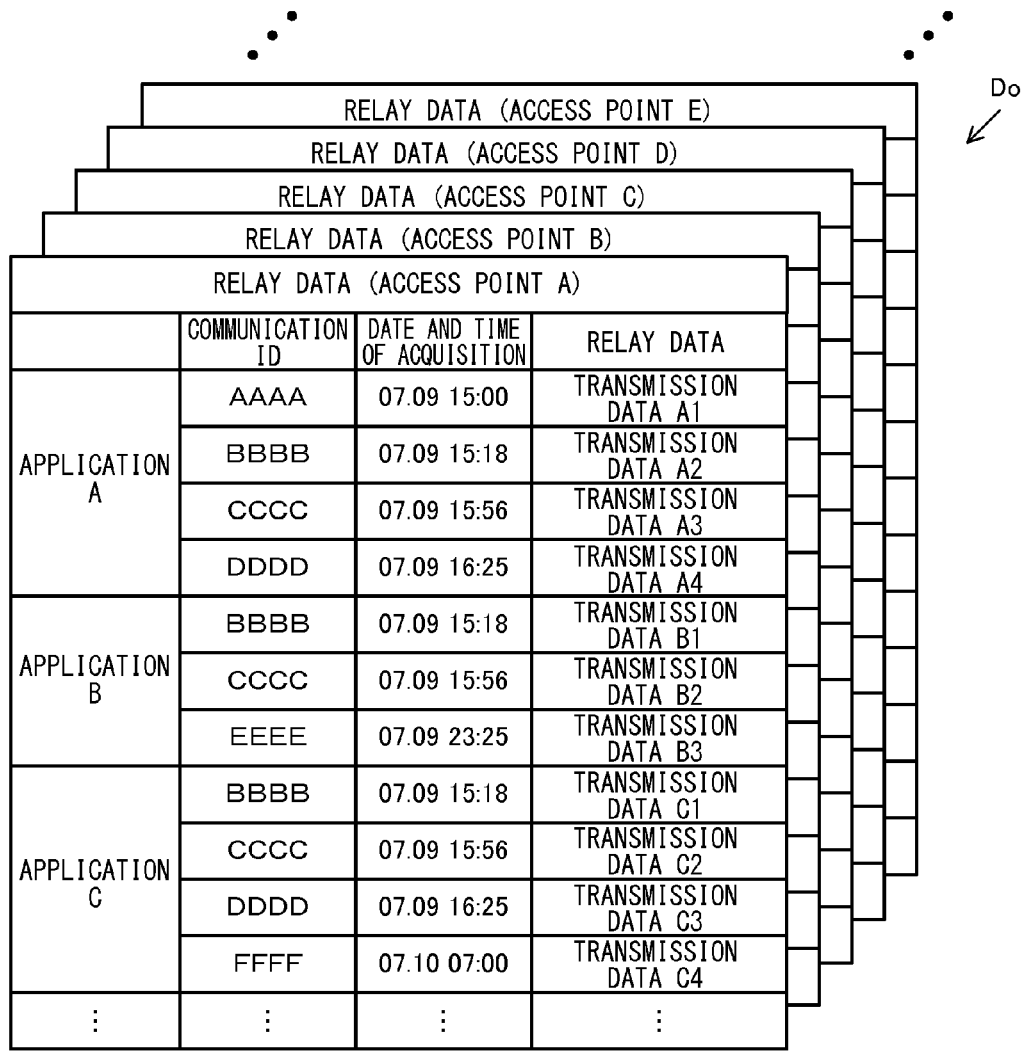

F I G. 1 3
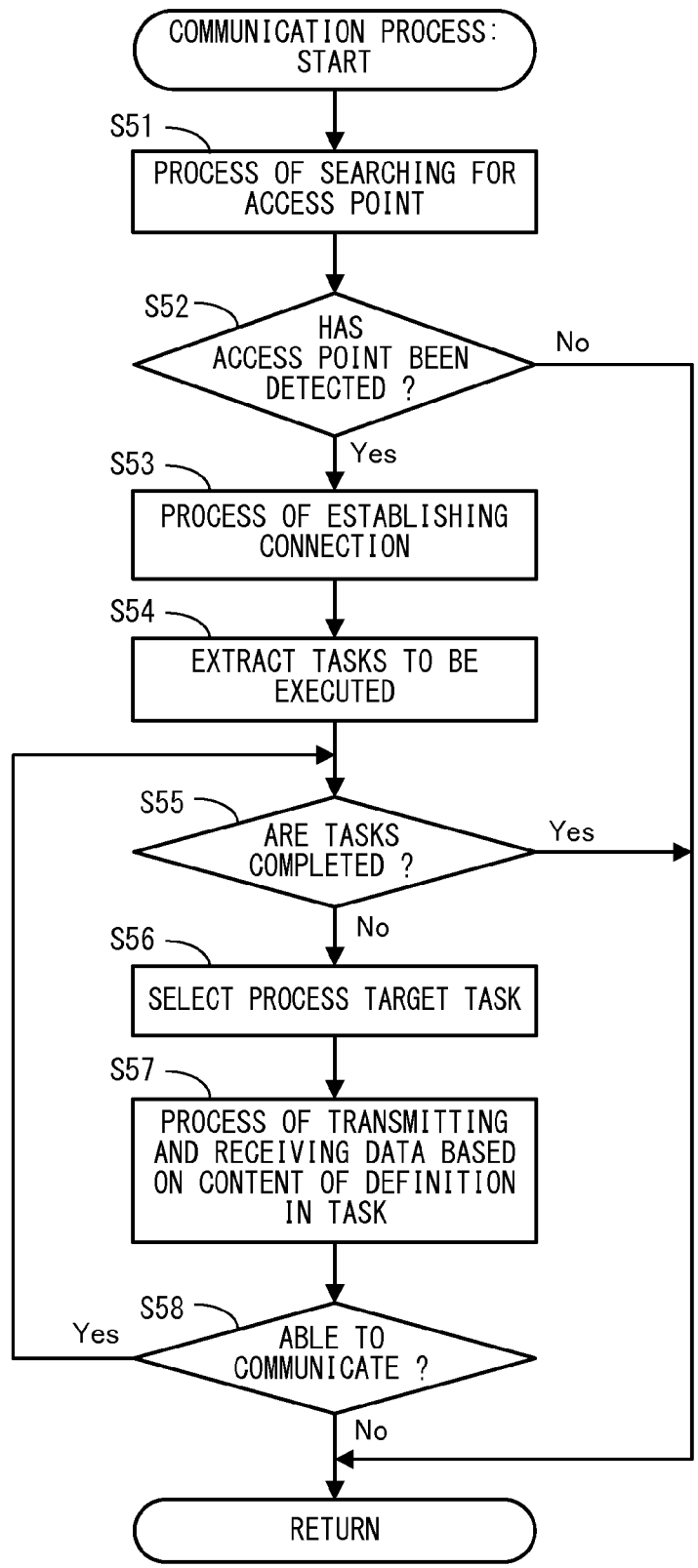

STORAGE MEDIUM HAVING STORED THEREIN COMMUNICATION PROGRAM, INFORMATION PROCESSING APPARATUS, COMMUNICATION TERMINAL APPARATUS, COMMUNICATION SYSTEM, AND COMMUNICATION METHOD

CROSS REFERENCE TO RELATED APPLICATION

The disclosure of Japanese Patent Application No. 2013-154550, filed on Jul. 25, 2013, is incorporated herein by reference.

FIELD

The technology shown here relates to a storage medium having stored therein a communication program, an information processing apparatus, a communication terminal apparatus, a communication system, and a communication method, and in particular, relates to a storage medium having stored therein a communication program in which, for example, a communication terminal apparatus transmits data to another communication terminal apparatus, and an information processing apparatus, a communication terminal apparatus, a communication system, and a communication method in which, for example, a communication terminal apparatus transmits data to another communication terminal apparatus.

BACKGROUND AND SUMMARY

Conventionally, there is a communication system in which a server apparatus receives position information from a plurality of information processing terminals and transmits information to information processing terminals close to each other on the basis of the position information.

In the communication system, however, two information processing terminals exchange data under the condition that the information processing terminals have come temporally and spatially close to each other.

Therefore, it is an object of an exemplary embodiment to provide a storage medium having stored therein a communication program capable of performing data communication by a novel mechanism, and an information processing apparatus, a communication terminal apparatus, a communication system, and a communication method that are capable of performing data communication by a novel mechanism.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

An exemplary configuration of a communication system according to an exemplary embodiment is a communication system including at least one information processing apparatus, a first communication terminal apparatus, a second communication terminal apparatus, and a third communication terminal apparatus, the first communication terminal apparatus, the second communication terminal apparatus, and the third communication terminal apparatus being capable of communicating with the information processing apparatus. The information processing apparatus includes a first data transmission/reception control unit, a second data transmission/reception control unit, and a third data transmission/reception control unit. The first data transmission/reception control unit, if having received access from the first communication terminal apparatus, acquires first identification information that enables identification of a position of the first communication terminal apparatus and transmission data transmitted from the first communication terminal apparatus, and stores the first identification information and the transmission data in a storage unit. The second data transmission/reception control unit, if having received access from the second communication terminal apparatus after the access from the first communication terminal apparatus, acquires second identification information that enables identification of a position of the second communication terminal apparatus and transmission data transmitted from the second communication terminal apparatus, stores the second identification information and the transmission data in the storage unit, and on the basis of the second identification information, transmits the transmission data of the first communication terminal apparatus stored in the storage unit to the second communication terminal apparatus. The third data transmission/reception control unit, if having received access from the third communication terminal apparatus after the access from the second communication terminal apparatus, acquires third identification information that enables identification of a position of the third communication terminal apparatus and transmission data transmitted from the third communication terminal apparatus, stores the third identification information and the transmission data in the storage unit, and on the basis of the third identification information, transmits the transmission data of the second communication terminal apparatus stored in the storage unit to the third communication terminal apparatus.

Based on the above, it is possible to relay transmission data by a so-called bucket brigade method, in which transmission data transmitted from a first communication terminal apparatus is transmitted to a second communication terminal apparatus, and transmission data transmitted from the second communication terminal apparatus is transmitted to a third communication terminal apparatus.

In addition, the exemplary embodiment may be carried out in the form of a communication method including the operations performed by the above units.

An exemplary configuration of a non-transitory computer-readable storage medium having stored therein a communication program according to the exemplary embodiment is a non-transitory computer-readable storage medium having stored therein a communication program to be executed by a computer included in at least one information processing apparatus capable of communicating with a communication terminal apparatus. The communication program causes the computer to execute: receiving access from the communication terminal apparatus; acquiring identification information that enables identification of a position of the communication terminal apparatus from which the access has been received and transmission data from the communication terminal apparatus, and storing the identification information and the transmission data in a storage unit; and if access has been received from the communication terminal apparatus next and thereafter, transmitting the transmission data stored in the storage unit to the communication terminal apparatus on the basis of identification information that enables identification of a position of the communication terminal apparatus.

Based on the above, transmission data transmitted from a communication terminal apparatus is relayed by an information processing apparatus, and on the basis of identification information of access, is transmitted to a communication terminal apparatus from which the access has been received next and thereafter. This enables data communication by a novel mechanism.

In addition, the transmission of the transmission data may include setting, on the basis of a position where the transmission data is received, a condition that is used to select a transmission target from among pieces of transmission data stored in the storage unit and is related to positions where the pieces of transmission data have been transmitted, as a first condition. In this case, in the transmission of the transmission data, transmission data that satisfies the first condition may be transmitted to the communication terminal apparatus from which the access has been received next and thereafter.

Based on the above, on the basis of the position where transmission data is transmitted and the position where transmission data is received, a transmission target is set. This enables data communication based on a greater variety of conditions.

In addition, the transmission of the transmission data may include setting, on the basis of information different from the identification information, a second condition for selecting a transmission target from the transmission data stored in the storage unit. In this case, in the transmission of the transmission data, transmission data that satisfies the second condition may be transmitted to the communication terminal apparatus from which the access has been received next and thereafter.

Based on the above, in addition to the identification information, on the basis of information different from the identification information, a transmission target is set. This enables data communication based on a greater variety of conditions.

In addition, in the setting of the second condition, the second condition may be set on the basis of a user attribute of the communication terminal apparatus having transmitted the transmission data and a user attribute of the communication terminal apparatus to which the transmission data is to be transmitted.

Based on the above, in addition to the identification information, on the basis of a user attribute, a transmission target is set. This enables data communication based on a greater variety of conditions.

In addition, the communication program may further cause the computer to execute acquiring transmission rejection information set in the communication terminal apparatus as transmission destination users to which transmission of data is rejected. In this case, in the setting of the second condition, the fact that a user of the communication terminal apparatus to which the transmission data is to be transmitted is not included in the transmission destination users of the transmission rejection information set in the communication terminal apparatus having transmitted the transmission data may be set as the second condition.

Based on the above, it is possible to relay the transmission data by eliminating a partner to which a transmission source user does not wish to transmit the transmission data.

In addition, the communication program may further cause the computer to execute acquiring reception rejection information set in the communication terminal apparatus as transmission source users from which reception of data is rejected. In this case, in the setting of the second condition, the fact that a user of the communication terminal apparatus having transmitted the transmission data is not included in the transmission source users of the reception rejection information set in the communication terminal apparatus to which the transmission data is to be transmitted may be set as the second condition.

Based on the above, it is possible to relay the transmission data by eliminating a partner from which a reception destination user does not wish to receive transmission data.

In addition, in the reception of the access, if access has been performed by the same communication terminal apparatus within a predetermined time from a position within a predetermined range with reference to a position of previous access, the access may be rejected.

Based on the above, a temporal restriction is added as a condition for communication. This makes it possible to prevent the transmission and reception of data from being executed successively based on access from within a predetermined range.

In addition, in the storage of the transmission data, if transmission data acquired from the same communication terminal apparatus as the communication terminal apparatus from which the access has been received is already stored in the storage unit, acquisition of new transmission data from the communication terminal apparatus may be rejected.

Based on the above, it is possible to prevent the situation where many pieces of transmission data are transmitted from the same communication terminal apparatus to the information processing apparatus and extracted by the information processing apparatus.

In addition, in the storage of the transmission data, the transmission data associated with each of a plurality of application may be acquired for the application and stored in the storage unit. In the transmission of the transmission data, in accordance with a transmission request made for each application, a piece of transmission data associated with the application may be selected from the pieces of transmission data stored in the storage unit and may be transmitted to the communication terminal apparatus having made the transmission request.

Based on the above, it is possible to transmit and receive transmission data associated with each of applications.

In addition, in the storage of the transmission data, the transmission data and data representing an application associated with the transmission data may be acquired together from the communication terminal apparatus from which the access has been received, and may be stored in the storage unit. In the transmission of the transmission data, if access has been received from the communication terminal apparatus next and thereafter, transmission data related to an application for which the communication terminal apparatus has made a transmission request may be extracted from the storage unit on the basis of the identification information, and may be transmitted to the communication terminal apparatus.

Based on the above, it is possible to transmit and receive transmission data with respect to each of applications.

In addition, in the transmission of the transmission data, if access has been received from the communication terminal apparatus next and thereafter, the transmission data transmitted from a position within a predetermined range with reference to a position of the communication terminal apparatus may be transmitted to the communication terminal apparatus.

Based on the above, it is possible to transmit transmission data of a communication terminal apparatus of which the transmission position is near another communication terminal apparatus, to the other communication terminal apparatus.

In addition, in the transmission of the transmission data, if access has been received from the communication terminal apparatus, the transmission data transmitted from a predetermined position set remotely in association with a position of the communication terminal apparatus may be transmitted to the communication terminal apparatus.

Based on the above, it is possible to transmit transmission data of a communication terminal apparatus of which the transmission position is relatively distant from another communication terminal apparatus, to the other communication terminal apparatus.

In addition, the information processing apparatus may be able to communicate with the communication terminal apparatus via any one of a plurality of access points. In the storage of the transmission data, information that identifies an access point to which the communication terminal apparatus from which the access has been received has been connected may be stored as the identification information in the storage unit. In the transmission of the transmission data, information that identifies an access point to which the communication terminal apparatus from which the access has been received next and thereafter has been connected may be set as the identification information, and the transmission data stored in the storage unit may be transmitted on the basis of the information.

Based on the above, it is possible to transmit and receive data using information, as the identification information, an identifier of an access point used by a communication terminal apparatus, and the like.

In addition, the communication program may further cause the computer to execute classifying the plurality of access points into groups. In this case, in the transmission of the transmission data, transmission data to be transmitted to the communication terminal apparatus from which the access has been received next and thereafter may be selected from transmission data transmitted from an access point belonging to the same group as an access point to which the communication terminal apparatus has been connected.

Based on the above, it is possible to control the transmission and reception of transmission data based on a unit of grouped access points.

In addition, in the transmission of the transmission data, transmission data to be transmitted to the communication terminal apparatus from which the access has been received next and thereafter may be selected from transmission data transmitted from the same access point as an access point to which the communication terminal apparatus has been connected.

Based on the above, it is possible to relay transmission data to a communication terminal apparatus that performs access from the same access point.

In addition, in the storage of the transmission data, transmission data transmitted from the communication terminal apparatus via a predetermined access point may be stored in the storage unit. In the transmission of the transmission data, the transmission data may be transmitted to the communication terminal apparatus from which the access has been received next and thereafter via the predetermined access point.

Based on the above, it is possible to relay transmission data to a communication terminal apparatus that performs access from an access point determined in advance.

In addition, in the storage of the transmission data, if a position of the communication terminal apparatus from which the access has been received is included within a predetermined area, the transmission data may be acquired from the communication terminal apparatus and stored in the storage unit. In the transmission of the transmission data, if a position of the communication terminal apparatus from which the access has been received next and thereafter is included within the predetermined area, the transmission data stored in the storage unit may be transmitted to the communication terminal apparatus.

Based on the above, it is possible to relay transmission data by setting a location where data can be transmitted and received.

In addition, in the storage of the transmission data, if a position of the communication terminal apparatus from which the access has been received is included within a predetermined area, acquisition of the transmission data from the communication terminal apparatus may be rejected. In the transmission of the transmission data, if a position of the communication terminal apparatus from which the access has been received is included within the predetermined area, transmission of the transmission data to the communication terminal apparatus may be rejected.

Based on the above, it is possible to relay transmission data by setting an area where transmission data is not transmitted and received.

In another exemplary configuration, a non-transitory computer-readable storage medium having stored therein a communication program according to the exemplary embodiment is a non-transitory computer-readable storage medium having stored therein a communication program to be executed by a computer included in a communication terminal apparatus capable of communicating with at least one information processing apparatus. The communication program causing the computer to execute: transmitting transmission data to the information processing apparatus; and while the transmission data is transmitted in the transmission of the transmission data, acquiring transmission data already transmitted from another apparatus to the information processing apparatus and stored in the information processing apparatus, from the information processing apparatus on the basis of identification information that enables identification of a position of the other apparatus and identification information that enables identification of a current position of the communication terminal apparatus.

In addition, in the transmission of the transmission data, a piece of transmission data of which transmission destination has been specified may be eliminated from among pieces of transmission data to be transmitted to the information processing apparatus, and the remaining pieces of transmission data are transmitted to the information processing apparatus.

Based on the above, it is possible to prevent the situation where transmission data of which the destination is set remains stored in the information processing apparatus and is not relayed.

In addition, the exemplary embodiment may be carried out in the forms of an information processing apparatus including at least some of the units configured to perform the above operations, and a communication terminal apparatus.

Based on the exemplary embodiment, transmission data transmitted from a communication terminal apparatus is relayed by an information processing apparatus, and on the basis of identification information of access, is transmitted to a communication terminal apparatus from which access has been received next and thereafter. This enables data communication by a novel mechanism.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 7 is a diagram showing a non-limiting example of the state of a fourth stage in which the communication terminal apparatuses 3 transmit and receive data to and from the relay server 200 in the communication system 1;

FIG. 9 is a diagram showing non-limiting examples of main data and programs stored in a memory 35 of the communication terminal apparatus 3;

FIG. 10 is a diagram showing non-limiting examples of main data and programs stored in a storage section 203 of the relay server 200;

FIG. 11 is a diagram showing a non-limiting example of relay data Do stored in the storage section 203;

FIG. 13 is a subroutine flow chart showing a non-limiting example of a communication process in step 45 of FIG. 12.

DETAILED DESCRIPTION OF NON-LIMITING EXAMPLE EMBODIMENTS

Figure 1:
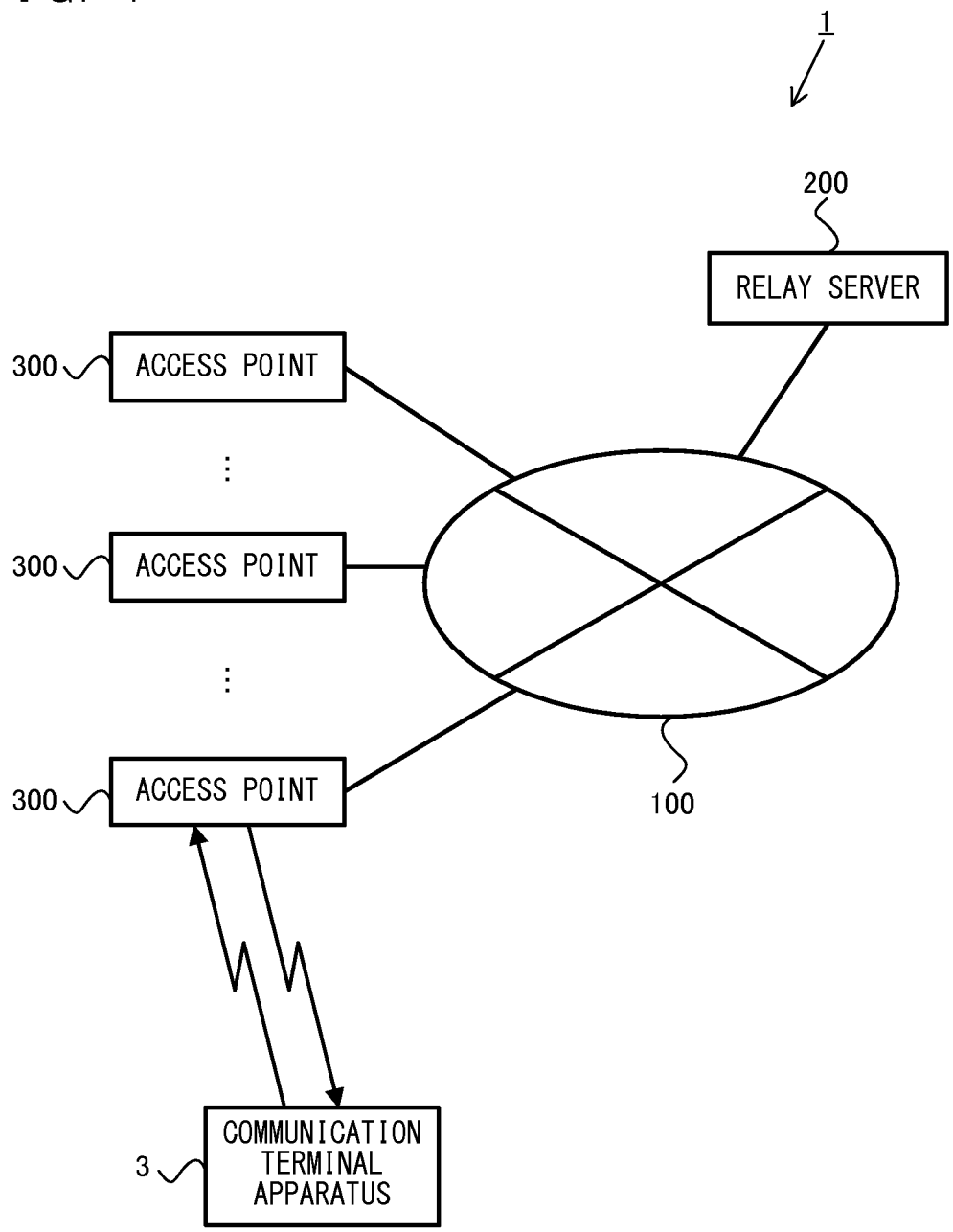
FIG. 1 is a diagram illustrating a non-limiting example of a communication system 1.

With reference to FIG. 1, a communication system according to an exemplary embodiment is described. As shown in FIG. 1, a communication system 1, which is an example of the communication system, is constructed by the connection between a communication terminal apparatus 3 and a relay server 200 via a network 100 and a plurality of access points 300.

The communication terminal apparatus 3 is configured to be connected to the network 100 via the access points 300 or the like using wireless communication. The communication terminal apparatus 3 can communicate with the relay server 200 by establishing connection with the relay server 200 via the network 100. For example, the communication terminal apparatus 3 can execute a program stored in a storage medium such as an exchangeable memory card or an exchangeable optical disk, or received from a server or another game apparatus. The communication terminal apparatus 3 may be a handheld game apparatus, or may be a device such as a general personal computer, a mobile phone, or a PDA (Personal Digital Assistant).

If having received a reception request from the communication terminal apparatus 3, the relay server 200 receives transmission data transmitted from the communication terminal apparatus 3, and stores the transmission data in a storage section. Further, if having received a transmission request from the communication terminal apparatus 3, the relay server 200 extracts, from transmission data already stored in the storage section, data to be transmitted in accordance with the transmission request, and transmits the extracted data to the communication terminal apparatus 3 having made the transmission request.

Figure 2:
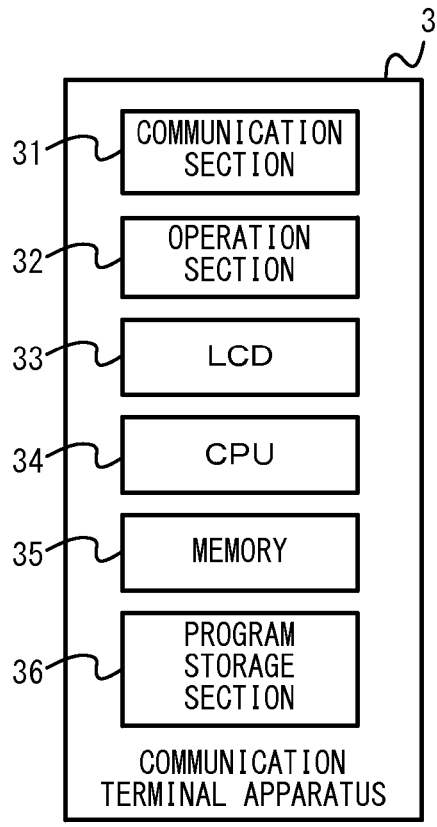
FIG. 2 is a block diagram showing a non-limiting example of the configuration of a communication terminal apparatus 3 in FIG. 1.

Next, with reference to FIG. 2, the communication terminal apparatus 3 is described. It should be noted that FIG. 2 is a block diagram showing an example of the configuration of the communication terminal apparatus 3.

The communication terminal apparatus 3 includes a communication section 31, an operation section 32, an LCD 33, a CPU 34, a memory 35, and a program storage section 36. It should be noted that the communication terminal apparatus 3 may include one or more apparatuses containing: an information processing apparatus having at least the CPU 34; and another apparatus.

The communication section 31 has the function of communicating wirelessly with another communication device and the like. In the exemplary embodiment, the communication section 31 has the function of connecting to a wireless LAN by a method based on the IEEE 802.11b/g/n/ac/ad standard or the like.

The CPU 34 is an example of information processing means (a computer) for executing various types of information processing. Further, the CPU 34 has the function of, as the various types of information processing, receiving relay data via the communication section 31, and executing processing based on the relay data, and the like. Further, the CPU 34 has the function of, as the various types of information processing, executing the process of creating transmission data to be transmitted to another communication terminal apparatus 3, and transmitting the transmission data to the other communication terminal apparatus 3 via the communication section 31, and the like. For example, the above functions are achieved by the CPU 34 executing a predetermined program. In the exemplary embodiment, the CPU 34 performs information processing (a communication control process) for setting the task of transmitting data to the relay server 200 and the task of receiving data from the relay server 200, and for executing the tasks when the CPU 34 has become able to communicate with the relay server 200 via the communication section 31.

The memory 35 stores various types of data for use when the CPU 34 performs the above information processing. The memory 35 is, for example, a memory accessible by the CPU 34.

The program storage section 36 stores a program. The program storage section 36 may be any storage device (storage medium) accessible by the CPU 34. For example, the program storage section 36 may be a storage device provided in the communication terminal apparatus 3 having the CPU 34, or may be a storage medium detachably attached to the communication terminal apparatus 3 having the CPU 34. Alternatively, the program storage section 36 may be a storage device (a server or the like) connected to the CPU 34 via a network. The CPU 34 may load a part or all of the program into the memory 35 at appropriate timing and execute the loaded program.

The operation section 32 is an input apparatus that can be operated by a user. The operation section 32 may be any input apparatus. For example, the operation section 32 may include an operation button, a stick, a touch panel, and an orientation sensor such as a gyro sensor.

The LCD 33 is an example of a display section included in the communication terminal apparatus 3, and displays an image in accordance with an instruction from the CPU 34. It should be noted that the LCD 33 may be a display apparatus capable of displaying a stereoscopically visible image by displaying a left-eye image and a right-eye image using substantially the same display area.

Figure 3:
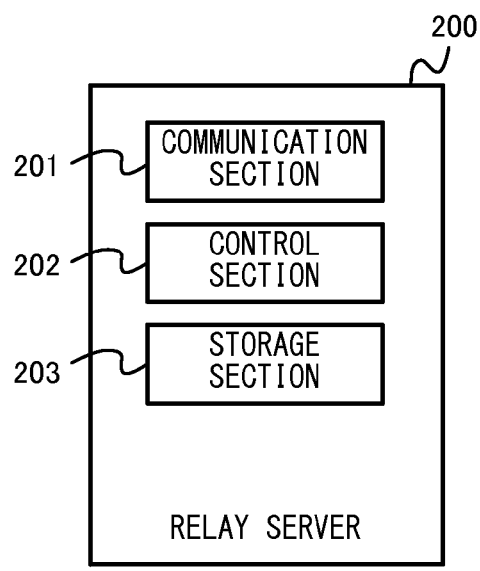
FIG. 3 is a block diagram showing a non-limiting example of the configuration of a relay server 200 in FIG. 1.

Next, with reference to FIG. 3, the relay server 200 is described. It should be noted that FIG. 3 is a block diagram showing an example of the configuration of the relay server 200.

The relay server 200 includes a communication section 201, a control section 202, and a storage section 203. The communication section 201 transmits and receives communication packets, thereby communicating with the communication terminal apparatus 3, another apparatus (for example, another server), and the like via the network 100. The control section 202 performs the process of, in accordance with a reception request from the communication terminal apparatus 3, receiving transmission data transmitted from the communication terminal apparatus 3, and storing the transmission data in the storage section 203; the process of, in accordance with a transmission request from the communication terminal apparatus 3, extracting transmission targets from relay data stored in the storage section 203, and transmitting data of the extracted transmission targets to the communication terminal apparatus 3 having made the transmission request; and the like. The storage section 203 stores: a program to be executed by the control section 202; various types of data necessary for the process of transmitting and receiving data to and from the communication terminal apparatus 3; and the like. It should be noted that the relay server 200 may be formed of a single server machine, or may be formed of a plurality of server machines.

Figure 4:
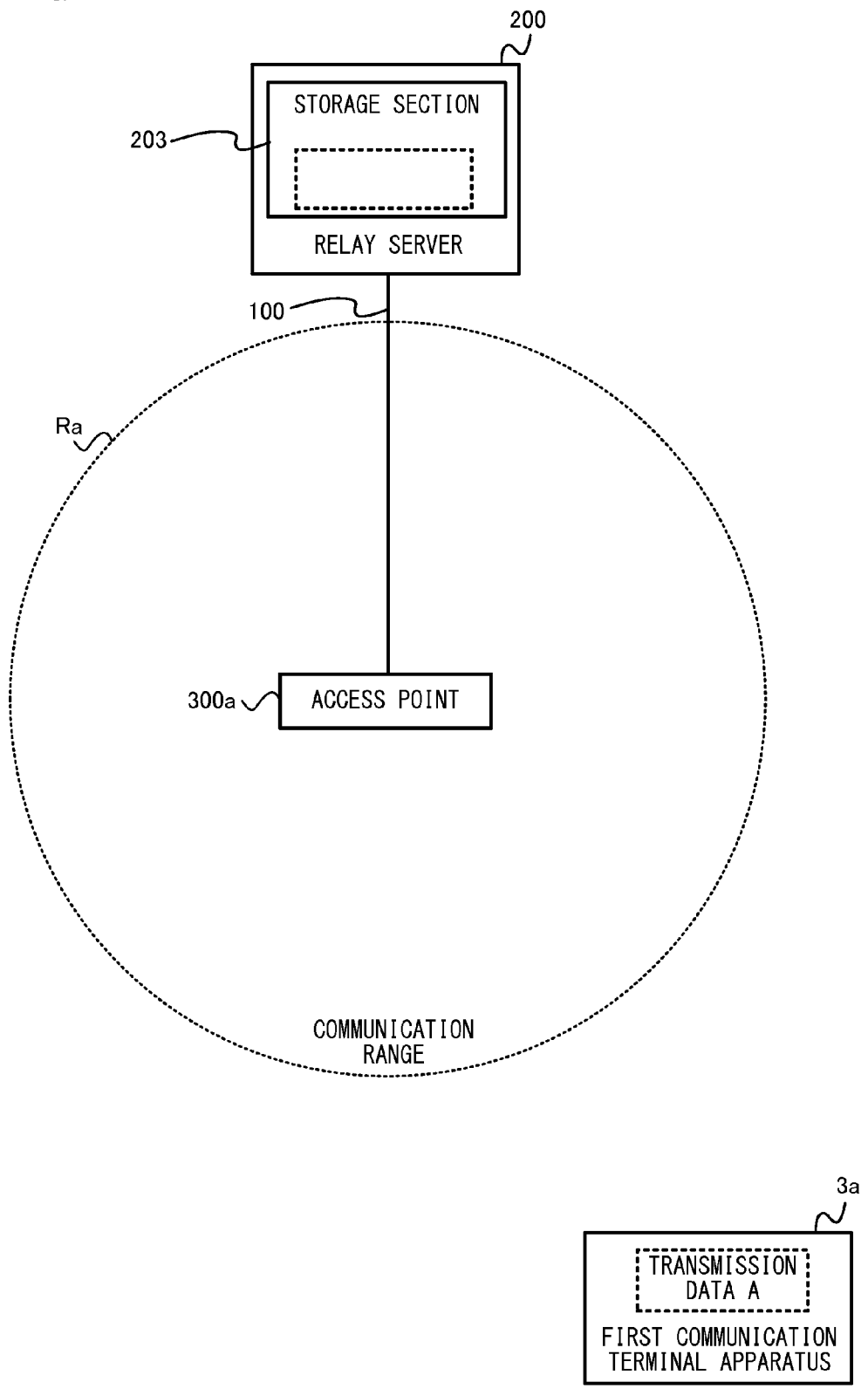
FIG. 4 is a diagram showing a non-limiting example of the state of a first stage in which communication terminal apparatuses 3 transmit and receive data to and from the relay server 200 in the communication system 1.
Figure 5:
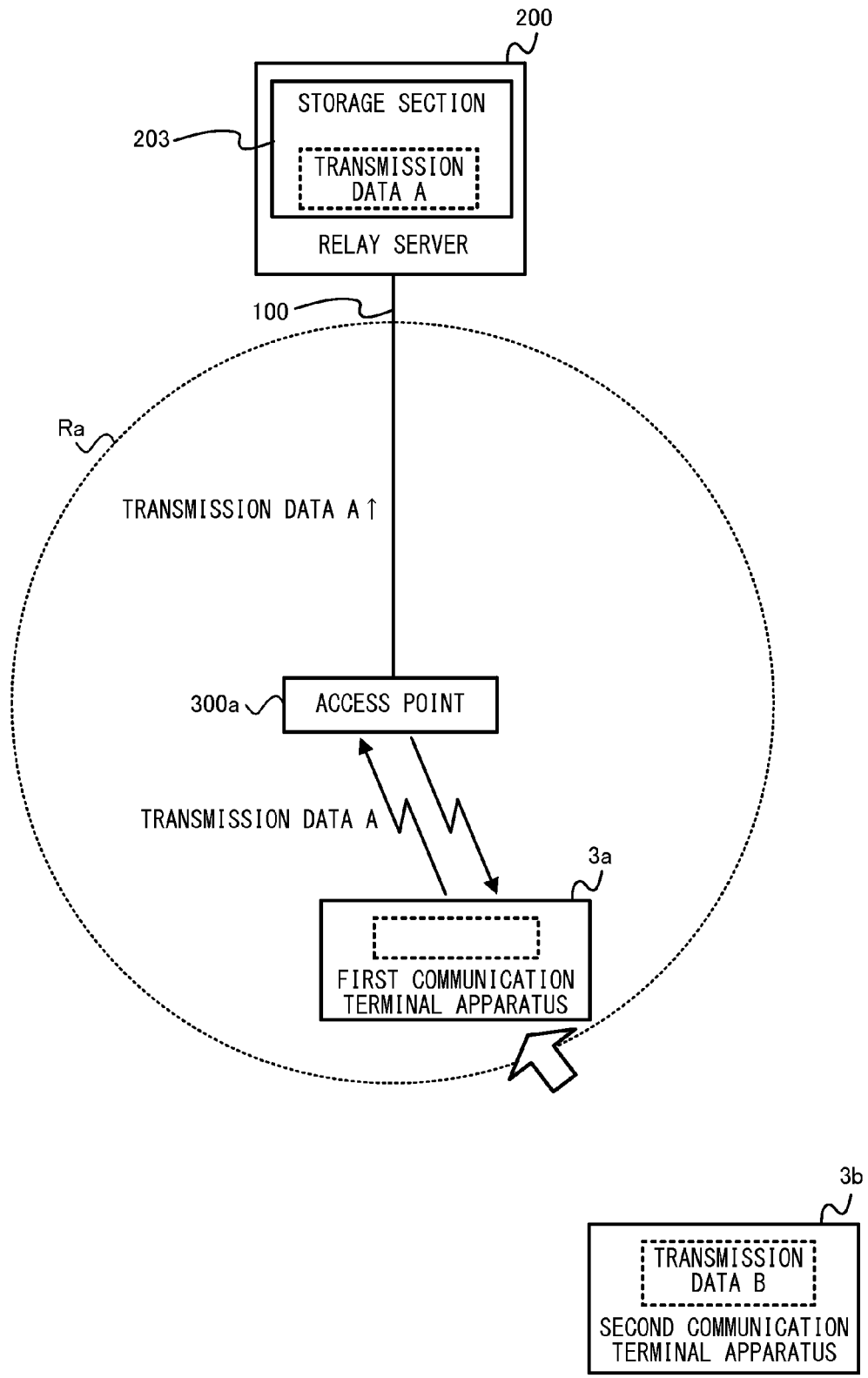
FIG. 5 is a diagram showing a non-limiting example of the state of a second stage in which the communication terminal apparatuses 3 transmit and receive data to and from the relay server 200 in the communication system 1.
Figure 6:
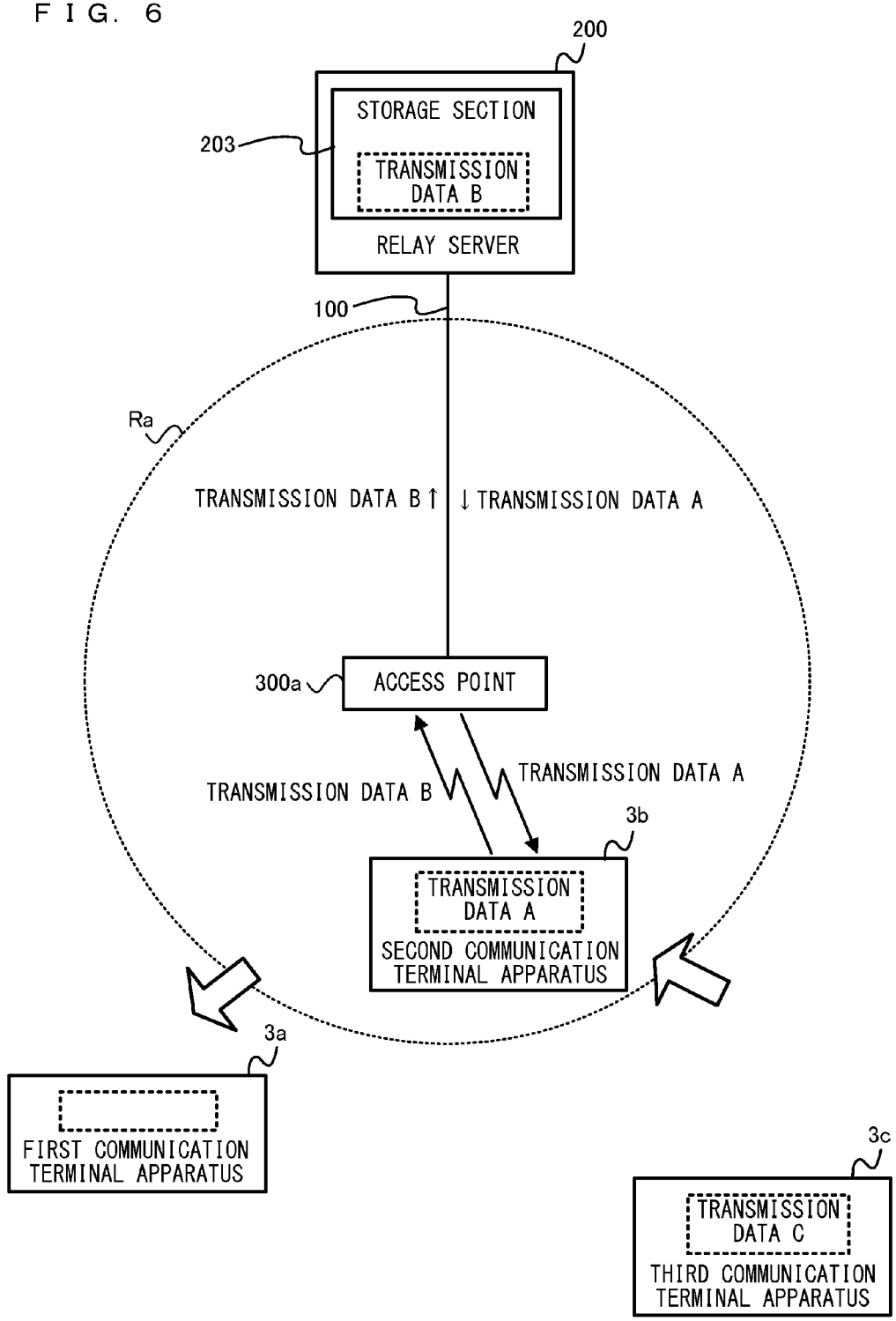
FIG. 6 is a diagram showing a non-limiting example of the state of a third stage in which the communication terminal apparatuses 3 transmit and receive data to and from the relay server 200 in the communication system 1.
Figure 8:
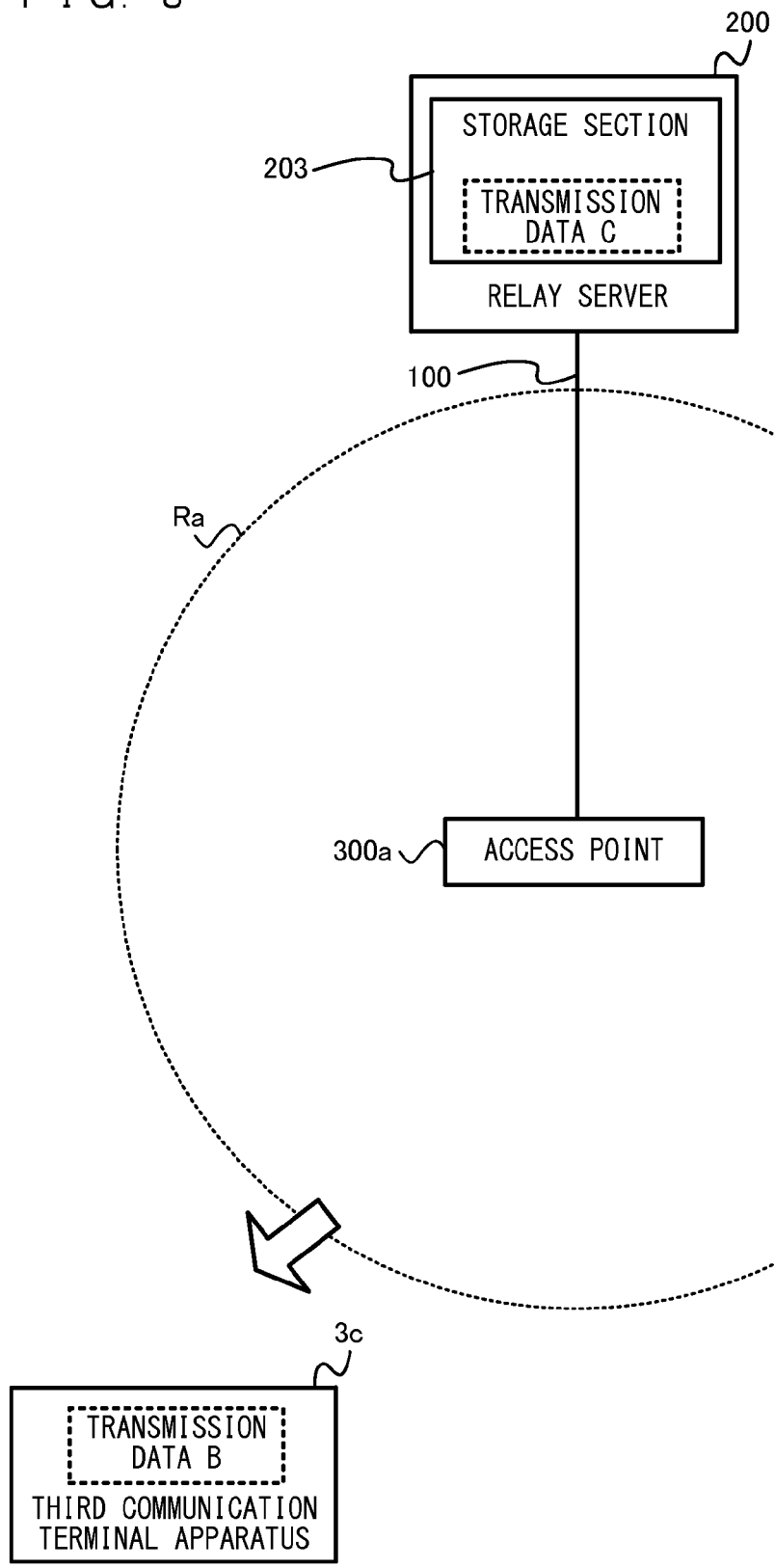
FIG. 8 is a diagram showing a non-limiting example of the state of a fifth stage in which the communication terminal apparatuses 3 transmit and receive data to and from the relay server 200 in the communication system 1.

Next, with reference to FIGS. 4 through 8, a description is given of an overview of the processing performed in the communication system 1, before the description of specific processing performed by the communication terminal apparatus 3 and the relay server 200. It should be noted that FIG. 4 is a diagram showing an example of the state of a first stage in which communication terminal apparatuses 3 transmit and receive data to and from the relay server 200 in the communication system 1. FIG. 5 is a diagram showing an example of the state of a second stage in which the communication terminal apparatuses 3 transmit and receive data to and from the relay server 200 in the communication system 1. FIG. 6 is a diagram showing an example of the state of a third stage in which the communication terminal apparatuses 3 transmit and receive data to and from the relay server 200 in the communication system 1. FIG. 7 is a diagram showing an example of the state of a fourth stage in which the communication terminal apparatuses 3 transmit and receive data to and from the relay server 200 in the communication system 1. FIG. 8 is a diagram showing an example of the state of a fifth stage in which the communication terminal apparatuses 3 transmit and receive data to and from the relay server 200 in the communication system 1.

In FIG. 4, the relay server 200 is connected to an access point 300a, which is one of the plurality of access points 300, via the network 100. The access point 300a has a communication range Ra, which allows wireless communication with each of the communication terminal apparatuses 3. It should be noted that relay data to be relayed to each of the communication terminal apparatuses 3 is not stored in the storage section 203 of the relay server 200.

In addition, a first communication terminal apparatus 3a, which is one of a plurality of communication terminal apparatuses 3, is placed outside the communication range Ra. Here, in the first communication terminal apparatus 3a, the task of transmitting transmission data A related to an application X to another one of the communication terminal apparatuses 3, and the task of receiving relay data related to the application X from another one of the communication terminal apparatuses 3 are registered.

Here, in the exemplary embodiment, a task is a concept that defines the content of the process for transmitting or receiving predetermined data to or from another one of the communication terminal apparatuses 3 via the relay server 200. The above tasks correspond to a transmission process and a reception process and are managed as a transmission task and a reception task, respectively. Then, if any one of the communication terminal apparatuses 3 in which a transmission task and/or a reception task are registered has been placed within a communication range R of any one of the access points 300 and has become able to transmit and receive data to and from the relay server 200 via the access point 300, the transmission task and/or the reception task are executed between the communication terminal apparatus 3 and the relay server 200. It should be noted that in the exemplary embodiment, a transmission task defines the process of transmitting transmission data associated with an application to an unspecified communication terminal apparatus 3. The execution of the transmission task leads to transmitting the transmission data to the relay server 200. Further, a reception task defines the process of making a reception request to receive, from an unspecified communication terminal apparatus 3, transmission data (relay data) associated with an application. The execution of the reception task leads to transmitting the relay data stored in the relay server 200 as transmission data to the reception request source.

In FIG. 5, if the first communication terminal apparatus 3a in which the above tasks are registered has entered within the communication range Ra of the access point 300a, the process is automatically performed of establishing the connection between the first communication terminal apparatus 3a and the access point 300a using wireless communication. Then, in accordance with the transmission task registered in the first communication terminal apparatus 3a, the transmission data A related to the application X is transmitted to the relay server 200 via the access point 300a. Then, the transmission data A is transmitted to the relay server 200 via the network 100 and stored in the storage section 203 as relay data related to the application X transmitted via the access point 300a. It should be noted that in the first communication terminal apparatus 3a, the reception task of receiving relay data related to the application X from another one of the communication terminal apparatuses 3 is registered. If, however, appropriate relay data related to the application X is not stored in the relay server 200, relay data is not transmitted to the first communication terminal apparatus 3a. In this case, the registered task is not executed. Thus, the first communication terminal apparatus 3a goes out of the communication range Ra in the state where the first communication terminal apparatus 3a has not received relay data (see FIG. 6).

Meanwhile, a second communication terminal apparatus 3b, which is one of the plurality of communication terminal apparatuses 3, is placed outside the communication range Ra. Here, in the second communication terminal apparatus 3b, a transmission task of transmitting transmission data B related to the application X to another one of the communication terminal apparatuses 3, and a reception task of receiving relay data related to the application X from another one of the communication terminal apparatuses 3 are registered.

In FIG. 6, if the second communication terminal apparatus 3b in which the above tasks are registered has entered within the communication range Ra of the access point 300a, the process is automatically performed of establishing the connection between the second communication terminal apparatus 3b and the access point 300a using wireless communication, similarly to the first communication terminal apparatus 3a. Then, in accordance with the transmission task registered in the second communication terminal apparatus 3b, the transmission data B related to the application X is transmitted to the relay server 200 via the access point 300a. Then, the transmission data B is transmitted to the relay server 200 via the network 100 and stored in the storage section 203 as relay data related to the application X transmitted via the access point 300a, similarly to the transmission data A. Further, in accordance with the reception task registered in the second communication terminal apparatus 3b, the relay server 200 transmits relay data related to the application X transmitted via the access point 300a to the second communication terminal apparatus 3b. For example, if having received from one of the communication terminal apparatuses 3 a reception request to receive relay data related to the application X, the relay server 200 extracts, among pieces of relay data related to the application for which the reception request has been made, relay data having the earliest date and time of storage when transmitted via the access point 300a from the storage section 203, as a transmission target. Then, the relay server 200 transmits the extracted transmission target (relay data) to the reception request source (the second communication terminal apparatus 3b) and deletes the transmission target from the storage section 203. Here, as described with reference to FIG. 5, in the storage section 203, the transmission data A transmitted from the first communication terminal apparatus 3a is stored as relay data related to the application X transmitted via the access point 300a. Thus, the relay server 200 transmits the transmission data A to the second communication terminal apparatus 3b as a transmission target. Then, the second communication terminal apparatus 3b receives the transmission data A and goes out of the communication range Ra with the transmission data A stored in a storage section (for example, the memory 35) (see FIG. 7).

In addition, a third communication terminal apparatus 3c, which is one of the plurality of communication terminal apparatuses 3, is placed outside the communication range Ra. Here, in the third communication terminal apparatus 3c, a transmission task of transmitting transmission data C related to the application X to another one of the communication terminal apparatuses 3, and a reception task of receiving relay data related to the application X from another one of the communication terminal apparatuses 3 are registered.

In FIG. 7, if the third communication terminal apparatus 3c in which the above tasks are registered has entered within the communication range Ra of the access point 300a, the process is automatically performed of establishing the connection between the third communication terminal apparatus 3c and the access point 300a using wireless communication, similarly to the first communication terminal apparatus 3a and the like. Then, in accordance with the transmission task registered in the third communication terminal apparatus 3c, the transmission data C related to the application X is transmitted to the relay server 200 via the access point 300a. Then, the transmission data C is transmitted to the relay server 200 via the network 100 and stored in the storage section 203 as relay data related to the application X transmitted via the access point 300a, similarly to the transmission data A and the like. Further, in accordance with the reception task registered in the third communication terminal apparatus 3c, the relay server 200 transmits relay data related to the application X transmitted via the access point 300a to the third communication terminal apparatus 3c. Here, as described with reference to FIG. 6, in the storage section 203, the transmission data B transmitted from the second communication terminal apparatus 3b is stored as the oldest relay data related to the application X transmitted via the access point 300a. Thus, the relay server 200 transmits the transmission data B to the third communication terminal apparatus 3c as a transmission target and deletes the transmission data B from the storage section 203 after the transmission.

Then, as shown in FIG. 8, the third communication terminal apparatus 3c receives the transmission data B and goes out of the communication range Ra with the transmission data B stored in a storage section (for example, the memory 35). Then, in the storage section 203 of the relay server 200, the transmission data C transmitted from the third communication terminal apparatus 3c is stored as relay data related to the application X transmitted via the access point 300a.

As described above, transmission data registered on the basis of a transmission task in each of the communication terminal apparatuses 3 is relayed by the relay server 200 and transmitted to another one of the communication terminal apparatuses 3. Then, as is clear from the description given with reference to FIGS. 4 to 8, the transmission data A transmitted from the first communication terminal apparatus 3a can be received by the second communication terminal apparatus 3b, the transmission data B transmitted from the second communication terminal apparatus 3b can be received by the third communication terminal apparatus 3c, and the transmission data C transmitted from the third communication terminal apparatus 3c can be received by any one of the communication terminal apparatuses 3 that accesses the relay server 200 next via the access point 300a. As described above, transmission data registered on the basis of a transmission task is not exchanged between a pair of communication terminal apparatuses 3, but is transferred to another communication terminal apparatus 3 via the relay server 200 by a bucket brigade method.

Here, the above overview of the processing performed in the communication system 1 uses the example where a plurality of communication terminal apparatuses 3 access the relay server 200 via the access point 300a. If, however, the plurality of communication terminal apparatuses 3 can access the relay server 200 via a plurality of access points 300, the relay server 200 manages relay data as described above with respect to each access point 300. For example, if having received from one of the communication terminal apparatuses 3 a reception request to receive relay data, the relay server 200 determines, as a transmission target, relay data transmitted and stored via the same access point 300 as the access point 300 with which the communication terminal apparatus 3 is establishing connection. That is, if a plurality of access points 300 that allow access to the relay server 200 are set, the above mechanism of communication using the bucket brigade method is carried out such that pieces of data accessed via the same access point 300 are targets. As described above, in the above mechanism of communication, if a plurality of communication terminal apparatuses 3 have entered and gone out of a single communication range R formed at a certain position, pieces of data transmitted from the communication terminal apparatuses 3 are set as a group. In another communication range R formed at another position, another data group is set. Thus, information of each of the access points 300 with which each of the communication terminal apparatuses 3 establishes communication is handled as identification information that enables the identification of the position where the communication terminal apparatus 3 has accessed the relay server 200 (that is, the installation position of the access point 300 or a communication range R of the access point 300), and the above communication control is performed with respect to each access position based on the identification information.

It should be noted that in the above processing performed in the communication system 1, the relay server 200 and the communication terminal apparatuses 3 may communicate with each other by adding the following additional conditions.

As a first example, the relay server 200 may perform the above communication control by grouping a plurality of access points 300 accessible by the communication terminal apparatuses 3. For example, the relay server 200 sets a group of grouped access points 300 as one unit to manage relay data as described above with respect to each group of access points 300. In this case, if having received from one of the communication terminal apparatuses 3 a reception request to receive relay data, the relay server 200 determines, as a transmission target, relay data transmitted and stored via the access point 300 belonging to the same group as the access point 300 with which the communication terminal apparatus 3 is establishing connection. This increases the number of targets to which transmission data is to be relayed via the relay server 200. This can increase the probability that data is transmitted and received by the above method. It should be noted that as an example of grouping a plurality of access points 300, access points 300 placed near each other or access points 300 placed within a predetermined distance or in a predetermined region may be set as one group. Alternatively, access points 300 may be grouped based on the type of installation location (for example, based on the type of business of the installation store, or based on the type of chain store).

As a second example, the relay server 200 may separately set an access point 300 that receives transmission data from each of the communication terminal apparatuses 3 and an access point 300 that relays and transmits the transmission data to another one of the communication terminal apparatuses 3. For example, the relay server 200 sets a set of an access point 300*a* that receives transmission data and an access point 300*b* that transmits relay data. Then, the relay server 200 determines, as a transmission target, transmission data transmitted via the access point 300*a* for each of the communication terminal apparatuses 3 having made a reception request to receive relay data via the access point 300*b*. Further, the relay server 200 may add the opposite setting to the above set of access points 300, that is, the setting for transmitting, via the access point 300*a*, transmission data received via the access point 300*b*. In this case, the relay server 200 determines, as a transmission target, transmission data transmitted via the access point 300*a* for each of the communication terminal apparatuses 3 having made a reception request to receive relay data via the access point 300*b*. The relay server 200 also determines, as a transmission target, transmission data transmitted via the access point 300*b* for each of the communication terminal apparatuses 3 having made a reception request to receive relay data via the access point 300*a*. For example, such a mechanism of transmission and reception is set for a set of access points 300 placed at positions remote from each other. This can provide an unconventional communication environment where transmission data is automatically exchanged between set locations remote from each other.

As a third example, each of the communication terminal apparatuses 3 may select transmission data to be a transmission target in accordance with user attribute information of a user to and from which data is transmitted and received, in addition to the above identification information. For example, the case is considered where in one of the communication terminal apparatuses 3, transmission destination users are set in advance by the user of the communication terminal apparatus 3 (for example, friend data of friends of the user is set). If at least one of the transmission destination users is specified as the destination of transmission data to be transmitted to another one of the communication terminal apparatuses 3, the transmission data may be removed from transmission targets to be transmitted to the relay server 200. This makes it possible to transmit transmission data to the relay server 200 on the basis of a greater variety of conditions, and also prevent the situation where, while transmission data remains stored in the relay server 200 with its destinations set, none of the communication terminal apparatuses 3 corresponding to the destinations accesses the relay server 200, whereby the transmission data remains without being indefinitely relayed.

As a fourth example, the relay server 200 may select relay data to be a transmission target in accordance with user attribute information of a user to and from which data is transmitted and received, in addition to the above identification information. For example, if the user of one of the communication terminal apparatuses 3 has set in the communication terminal apparatus 3 a partner to which the user does not wish to transmit transmission data (for example, the user has set transmission destination blacklist data), the relay server 200 may remove transmission data of the user from transmission targets to be transmitted to the partner. Further, if the user of one of the communication terminal apparatuses 3 has set in the communication terminal apparatus 3 a partner from which the user does not wish to receive relay data (for example, the user has set reception rejection blacklist data), the relay server 200 may remove transmission data of the partner from transmission targets to be transmitted to the user. In either case, every time one of the communication terminal apparatuses 3 has accessed the relay server 200, the relay server 200 acquires data representing the above setting from the communication terminal apparatus 3, and with reference to the data, selects relay data to be a transmission target. This enables the relay server 200 to relay data to the communication terminal apparatuses 3 on the basis of a greater variety of conditions.

As a fifth example, the relay server 200 may add a temporal condition for permitting access. For example, if one of the communication terminal apparatuses 3 having once accessed the relay server 200 has re-accessed the relay server 200 via the same access point 300 within a predetermined time (for example, within 8 hours), the relay server 200 may reject a transmission request to transmit transmission data and a reception request to receive relay data in the re-access. Thus, a transmission task and/or a reception task in each of the communication terminal apparatuses 3 are not executed if performed via the same access point 300 within a predetermined time. It should be noted that if one of the communication terminal apparatuses 3 having once accessed the relay server 200 has re-accessed the relay server 200 via a different access point 300, the relay server 200 accepts a transmission request to transmit transmission data and a reception request to receive relay data in the re-access as normal even within the predetermined time. As described above, the addition of a temporal restriction as a condition for performing communication can prevent the successive execution of tasks via the same access point 300.

As a sixth example, if relay data of the same user is stored in the storage section 203, the relay server 200 may reject the reception of transmission data from the user. For example, the case is considered where one of the communication terminal apparatuses 3 transmits transmission data related to the application X to the relay server 200. If transmission data related to the application X transmitted from the user of the communication terminal apparatus 3 is already stored in the storage section 203, the relay server 200 may reject the reception of the transmission data. Typically, if transmission data of the same user transmitted via the same access point 300 as the access point 300 to which an attempt is being made to transmit transmission data is already stored in the storage section 203, the reception of the transmission data is rejected. This can prevent the situation where many pieces of transmission data are transmitted from the same communication terminal apparatus 3 to the relay server 200 and extracted by the relay server 200.

As a seventh example, each of the communication terminal apparatuses 3 may simultaneously transmit a plurality of pieces of transmission data related to a plurality of applications to the relay server 200. Further, the relay server 200 may simultaneously transmit a plurality of pieces of relay data related to a plurality of applications to each of the communication terminal apparatuses 3. For example, each of the communication terminal apparatuses 3 may set a transmission task of registering the transmission of transmission data having one title so as to correspond to an application, and performing such registration for a plurality of applications, thereby collectively transmitting a plurality of pieces of transmission data to the relay server 200. Further, each of the communication terminal apparatuses 3 may set a reception task of registering a reception request to receive relay data having one title so as to correspond to an application, and simultaneously makes such a reception request to receive a plurality of applications, whereby the relay server 200 may collectively transmit a plurality of pieces of relay data to the communication terminal apparatus 3 in accordance with the reception request. In this case, when data is transmitted and received to and from the communication terminal apparatus 3, the relay server 200 determines whether or not transmission data can be received, and determines relay data to be a transmission target, with respect to each of the plurality of applications. Then, the relay server 200 receives transmission data and/or transmits relay data in accordance with the determination.

As an eighth example, the relay server 200 may set an access point 300 so as not to be used in communication using the above mechanism of the bucket brigade method. For example, the relay server 200 sets even an access point 300 capable of being used in communication with each of the communication terminal apparatuses 3, so as not to be used if the access point 300 is installed individually by a user. As an example, even if communication using the above mechanism of the bucket brigade method is performed with one of the communication terminal apparatuses 3 that accesses the relay server 200 via an access point 300 installed at the user's home, limited communication terminal apparatuses 3 (typically, only the communication terminal apparatus 3 of the user) can access the access point 300. As a result, while this communication is not effectively performed, only transmission data may be extracted by the relay server 200. To prevent such a situation, the relay server 200 performs communication using the above mechanism of the bucket brigade method with communication terminal apparatuses 3 that have accessed the relay server 200 via public access points 300.

As a ninth example, the relay server 200 may set an application so as not to be used in communication using the above mechanism of the bucket brigade method. For example, if a problem arises in the specifications of an application by transmitting and receiving transmission data using communication using the above mechanism, the relay server 200 may prohibit the transmission and reception of transmission data and/or relay data related to the application.

As a tenth example, as identification information that enables the identification of the position where each of the communication terminal apparatuses 3 has accessed the relay server 200, the relay server 200 may use not only information of the access points 300 (for example, identification information or installation position information) but also other information. As an example, if one of the communication terminal apparatuses 3 has a GPS (Global Positioning System) function, the relay server 200 acquires from the communication terminal apparatus 3 the position on earth calculated by the GPS function, as identification information that enables the identification of the position where the communication terminal apparatus 3 has accessed the relay server 200. Then, the relay server 200 performs the above communication control on the basis of the identification information. Specifically, the relay server 200 performs the process of setting a plurality of areas on earth and relaying transmission data on the basis of access from the same area, or performs the process of relaying transmission data on the basis of other access made from the position of access within a predetermined distance. As another example, if one of the communication terminal apparatuses 3 has the function of detecting the radio field intensity when performing wireless communication with each of the access points 300, the relay server 200 acquires, as identification information that enables the identification of the position where the communication terminal apparatus 3 has accessed the relay server 200, an access position calculated on the basis of the radio field intensity from each of the access points 300 detected by this function and the installation position of each of the access points 300, and the relay server 200 performs the above communication control on the basis of the identification information. Also in this case, it is possible to perform the process of relaying transmission data by handling identification information similarly to the above GPS information.

Next, a detailed description is given of the processing performed in the communication system 1. First, with reference to FIGS. 9 to 11, main data used in the processing is described. It should be noted that FIG. 9 is a diagram showing examples of main data and programs stored in the memory 35 of the communication terminal apparatus 3. FIG. 10 is a diagram showing examples of main data and programs stored in the storage section 203 of the relay server 200. FIG. 11 is a diagram showing an example of relay data Do stored in the storage section 203.

As shown in FIG. 9, the following are stored in the data storage area of the memory 35: operation data Da; communication ID data Db; device ID data Dc; access point identification information data Dd; transmission task data De; transmission data Df; reception task data Dg; reception data Dh; user attribute data Di; and the like. It should be noted that the memory 35 stores, as well as the data included in the information shown in FIG. 9, data necessary for the processing, such as data used in an application to be executed. Further, in the program storage area of the memory 35, various programs Pa included in the communication program are stored.

The operation data Da is data representing operation information of an operation performed on the operation section 32 by the user. For example, operation data indicating an operation performed on the operation section 32 such as an operation button or the like is acquired per unit of time that the communication terminal apparatus 3 performs processing (for example, every 1/60 seconds), and the operation data is stored and updated in the operation data Da in accordance with the acquisition.

The communication ID data Db is data representing a unique code that enables the identification of a communication application (a communication program) to be executed by the communication terminal apparatus 3, and is data representing, for example, a communication ID, which is a character string serving as an indicator for the identification of the communication application.

The device ID data Dc is data representing a unique code (a device ID) that enables the identification of the communication terminal apparatus 3, and is data representing, for example, an unalterable character string serving as an indicator for the identification of the device. The device ID data Dc stores the device ID set in advance for the communication terminal apparatus 3.

The access point identification information data Dd is data representing information for connecting to each of the access points 300. For example, the access point identification information data Dd stores data representing an identifier for connecting to each of the access points 300 (for example, an SSID (Service Set Identifier), an ESSID (Extended Service Set Identifier), a BSSID (Basic Service Set Identifier; a MAC address), or the like). It should be noted that if key information of keys such as a WEP (Wired Equivalent Privacy) key and a WPA (Wi-Fi Protected Access) key is necessary for connecting to each of the access points 300, the key information may be stored in the access point identification information data Dd.

The transmission task data De is data representing a transmission task registered in the communication terminal apparatus 3. The transmission data Df is data registered as data to be transmitted to another communication terminal apparatus 3 in a transmission task. When the transmission task is executed, transmission data to be transmitted to the relay server 200 is stored in the transmission data Df.

The reception task data Dg is data representing a reception task registered in the communication terminal apparatus 3. In the reception data Dh, relay data received from the relay server 200 is stored by the execution of a reception task.

The user attribute data Di is data set by the user of the communication terminal apparatus 3, and is data regarding other users which is used when data is transmitted and received. For example, the user attribute data Di includes: a transmission destination user list set by the user (for example, friend data representing friends of the user); a list of partner users to which the user does not wish to transmit transmission data (for example, transmission destination blacklist data), the list set by the user; a list of partner users from which the user does not wish to receive transmission data (for example, reception rejection blacklist data), the list set by the user; and the like.

As shown in FIG. 10, the following are stored in the data storage area of the storage section 203: user attribute data Dm; application attribute data Dn; relay data Do; access point group data Dp; and the like. It should be noted that the storage section 203 may store, as well as the data included in the information shown in FIG. 10, data and the like necessary for the processing performed by the relay server 200. Further, in the program storage area of the storage section 203, various programs Pb for achieving the above processing are stored.

In the user attribute data Dm, information regarding user attributes acquired, every time a communication terminal apparatus 3 has accessed the relay server 200, from the communication terminal apparatus 3. The information is stored with respect to each communication terminal apparatus 3. The user attribute data Dm is updated to information regarding the latest user attributes every time a communication terminal apparatus 3 has accessed the relay server 200. For example, data stored in the user attribute data Di described above is acquired from the communication terminal apparatus 3 and stored in the user attribute data Dm.

The application attribute data Dn is data representing the attributes of an application related to transmission data and/or relay data to be transmitted and received. In the application attribute data Dn, for example, information that enables the distinction between an application that permits communication using the above mechanism and an application that does not permit such communication is stored.

In the relay data Do, transmission data acquired from a communication terminal apparatus 3 is stored as relay data to be relayed to another communication terminal apparatus 3. For example, as shown in FIG. 11, the relay data Do is managed with respect to each access point through which transmission data has been acquired and with respect to each application related to the acquired transmission data. For example, an access point through which transmission data has been acquired is managed using a MAC address (Media Access Control address), which is set for each access point. For example, in the example shown in FIG. 11, in transmission data acquired via an access point A, pieces of transmission data A1 to A4 are described as pieces of data related to an application A. The pieces of transmission data A1 to A4 are associated with communication IDs of communication terminal apparatuses 3 having transmitted the pieces of transmission data A1 to A4, and are described in order of the date and time of acquisition. Similarly, pieces of transmission data B1 to B3 are described as pieces of data related to an application B, and pieces of transmission data C1 to C4 are described as pieces of data related to an application C. These pieces of transmission data are described in the relay data Do in accordance with the reception of transmission data from a communication terminal apparatus 3, and deleted from the relay data Do in accordance with the transmission to another communication terminal apparatus 3.

The access point group data Dp is data representing a group of access points set when relay data is transmitted. For example, when relay data is transmitted using the first example or the second example described above, data that defines a group of grouped access points or a set of access points is stored in the access point group data Dp.

Figure 12:
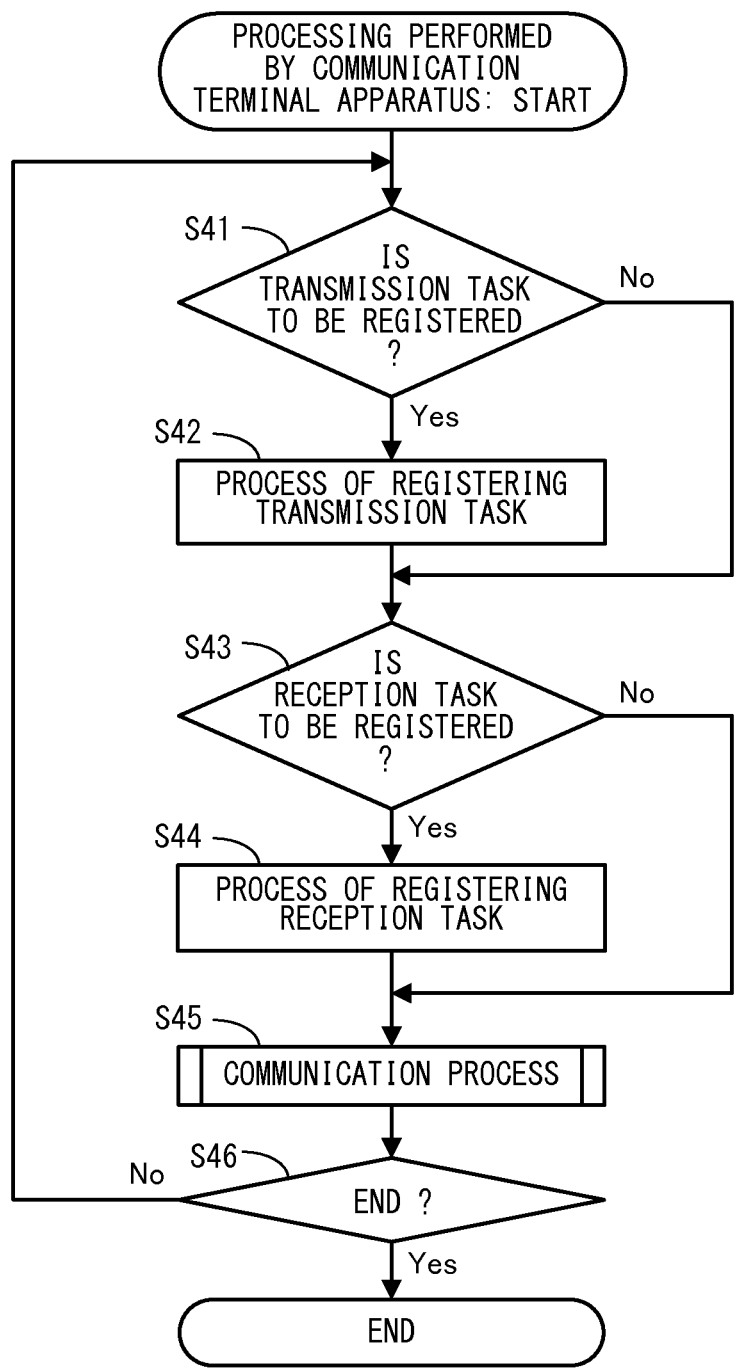
FIG. 12 is a flow chart showing a non-limiting example of the processing performed by the communication terminal apparatus 3.
Figure 14:
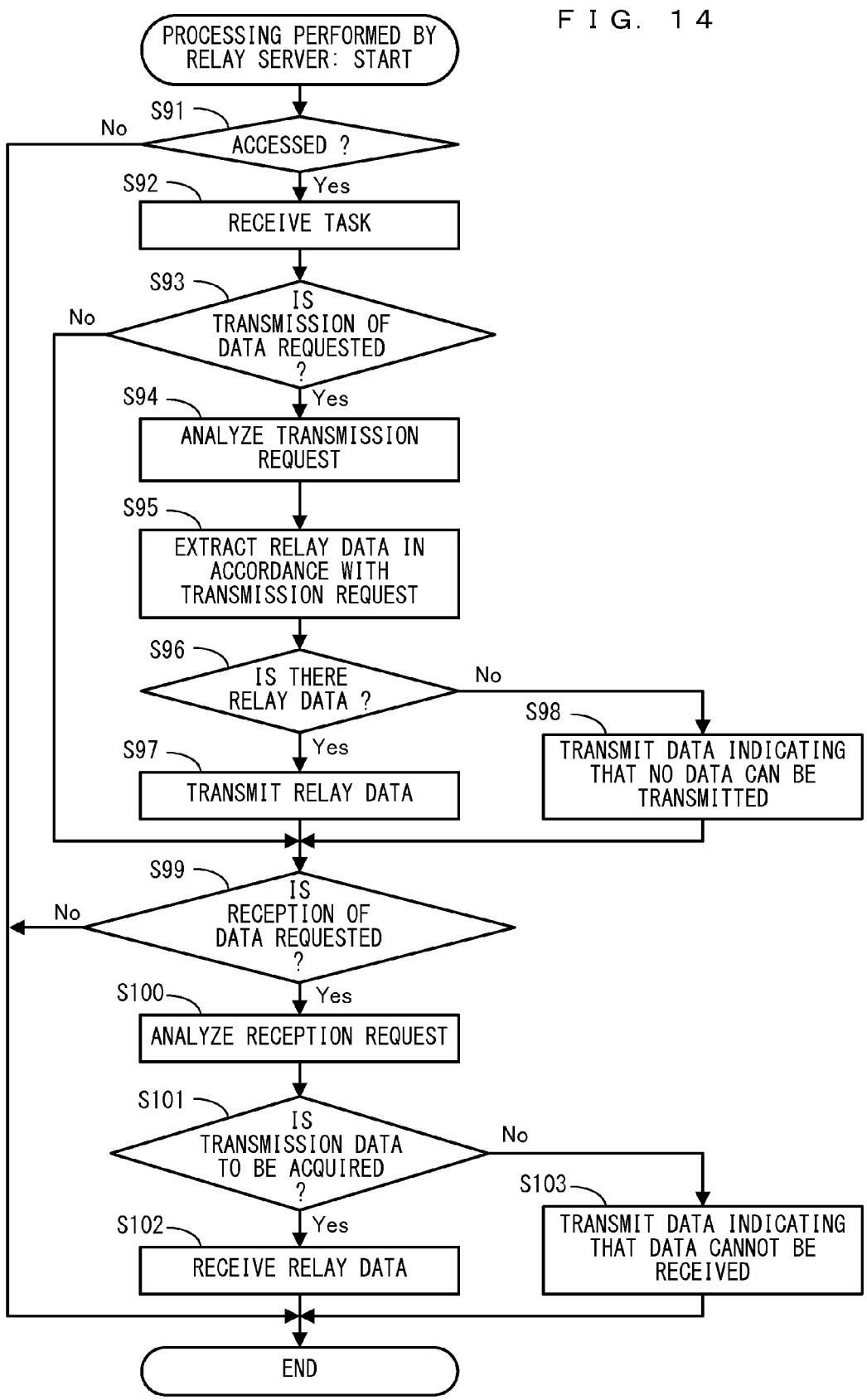
FIG. 14 is a flow chart showing a non-limiting example of the processing performed by the relay server 200.

Next, with reference to FIGS. 12 to 14, detailed descriptions are given of the processing performed by the communication terminal apparatus 3 and the relay server 200. It should be noted that FIG. 12 is a flow chart showing an example of the processing performed by the communication terminal apparatus 3. FIG. 13 is a subroutine flow chart showing an example of a communication process in step 45 of FIG. 12. FIG. 14 is a flow chart showing an example of the processing performed by the relay server 200. Here, in the flow charts shown in FIGS. 12 to 14, descriptions are given mainly of, in the processing performed in the communication system 1, a process regarding communication performed between the communication terminal apparatus 3 and the relay server 200. Detailed descriptions of other processes not directly related to these processes are omitted. Further, in FIGS. 12 to 14, all the steps performed by the CPU 34 and the control section 202 are abbreviated as "S".

In the exemplary embodiment, a series of processes shown in FIG. 12 are performed by the CPU 34 executing the communication program stored in the program storage section 36. It should be noted that the processing shown in FIG. 12 may be started at any timing. For example, in accordance with the fact that the user has given an instruction to register the task of communicating with the relay server 200, the execution of the communication program may be started. At this time, a part or all of the communication program is loaded into the memory 35 at appropriately timing and executed by the CPU 34. Consequently, the series of processes shown in FIG. 12 are started. It should be noted that the communication program is stored in advance in the program storage section 36. Alternatively, in another exemplary embodiment, the communication program may be acquired from a storage medium attachable to and detachable from the communication terminal apparatus 3 and stored in the memory 35, or may be acquired from another apparatus via a network such as the Internet and stored in the memory 35.

It should be noted that the processes of all the steps in the flow charts shown in FIGS. 12 and 13 are merely illustrative. Thus, the processing order of the steps may be changed, or another process may be performed in addition to, and/or instead of, the processes of all the steps, so long as similar results are obtained. Further, in the exemplary embodiment, descriptions are given on the assumption that the CPU 34 performs the processes of all the steps in the flow charts. Alternatively, a processor or a dedicated circuit other than the CPU 34 may perform the processes of some or all of the steps in the flow charts.

In FIG. 12, the CPU 34 determines whether or not a transmission task is to be registered (step 41). Then, if the CPU 34 has determined that a transmission task is to be registered, the processing proceeds to step 42. If, on the other hand, the CPU 34 has determined that a transmission task is not to be registered, the processing proceeds to step 43. For example, with reference to the operation data Da updated at each predetermined processing interval, if the user of the communication terminal apparatus 3 has performed the operation of registering a transmission task, the CPU 34 determines that a transmission task is to be registered.

In step 42, the CPU 34 performs the process of registering a transmission task of transmitting transmission data to another communication terminal apparatus 3, and the processing proceeds to step 43. For example, in accordance with a user operation, the CPU 34 sets a transmission task of transmitting transmission data to another communication terminal apparatus 3 via the relay server 200. Specifically, the CPU 34 stores, in the transmission data Df, transmission data that the user wishes to transmit to another communication terminal apparatus 3, and the CPU 34 also registers in the transmission task data De a transmission task indicating that the transmission data is to be transmitted to the relay server 200 in association with an application that uses the transmission data. It should be noted that if the user has performed the operation of giving an instruction to transmit a plurality of pieces of transmission data, the CPU 34 stores the plurality of pieces of transmission data in the transmission data Df and also registers in the transmission task data De a transmission task indicating that the plurality of pieces of transmission data are to be transmitted to the relay server 200 in association with applications that use the plurality of pieces of transmission data.

In step 43, the CPU 34 determines whether or not a reception task is to be registered. Then, if the CPU 34 has determined that a reception task is to be registered, the processing proceeds to step 44. If, on the other hand, the CPU 34 has determined that a reception task is not to be registered, the processing proceeds to step 45. For example, with reference to the operation data Da updated at each predetermined processing interval, if the user of the communication terminal apparatus 3 has performed the operation of registering a reception task, the CPU 34 determines that a reception task is to be registered.

In step 44, the CPU 34 performs the process of registering a reception task of receiving transmission data transmitted from another communication terminal apparatus 3, and the processing proceeds to step 45. For example, in accordance with a user operation, the CPU 34 sets a reception task of receiving relay data from the relay server 200. Specifically, the CPU 34 registers in the reception task data Dg a reception task indicating that the user wishes to specify an application that uses transmission data to be received from another communication terminal apparatus 3, thereby receiving the transmission data (a reception request). It should be noted that if the user has performed the operation of giving an instruction to collectively receive a plurality of pieces of transmission data related to a plurality of applications, the CPU 34 registers in the reception task data Dg a reception task indicating that the user wishes to specify a plurality of applications to be received, thereby receiving a plurality of pieces of relay data related to the applications from the relay server 200.

In step 45, the CPU 34 performs a communication process, and the processing proceeds to step 46. With reference to FIG. 13, the communication process performed in the above step 45 is described below.

In FIG. 13, the CPU 34 performs the process of searching for an access point (step 51), and the processing proceeds to the next step. For example, the CPU 34 searches for an access point by so-called passive scanning or active scanning, using an identifier for connecting to each of the access points 300, the identifier stored in the access point identification information data Dd.

Next, the CPU 34 determines whether or not an access point has been detected (step 52). If the CPU 34 has determined that an access point has been detected, the processing proceeds to step 53. If, on the other hand, the CPU 34 has determined that an access point has not been detected, the CPU 34 ends the processing of this subroutine.

In step 53, the CPU 34 performs the process of establishing connection with the access point detected in the above step 52, and the processing proceeds to the next step.

Next, the CPU 34 extracts tasks to be executed (step 54), and the processing proceeds to the next step. For example, with reference to the transmission task data De and the reception task data Dg, the CPU 34 extracts tasks to be executed at the current time.

Next, the CPU 34 determines whether or not all the tasks to be executed that have been extracted in the above step 54 have already been subjected to the processes of steps 56 and 57 described later. Then, if the CPU 34 has determined that there remain tasks yet to be subjected to the processes, the processing proceeds to step 56. If, on the other hand, the CPU 34 has determined that all the tasks have already been subjected to the processes, the CPU 34 ends the processing of the subroutine.

In step 56, the CPU 34 selects as a process target task any one of the tasks yet to be subjected to the processes, and the processing proceeds to the next step.

Next, on the basis of the content of the definition in the process target task, the CPU 34 performs the process of transmitting and receiving data to and from the relay server 200, and the processing proceeds to the next step. For example, with reference to the transmission task data De or the reception task data Dg corresponding to the process target task, the CPU 34 transmits and receives data to and from the relay server 200 on the basis of the content of the definition. For example, if the process target task is a transmission task, the process is performed of extracting transmission data regarding the transmission task from the transmission data Df, and transmitting the transmission data to the relay server 200 together with information for distinguishing an application related to the transmission data. Further, if the process target task is a reception task, the process is performed of specifying an application that the user wishes to receive, making a request to receive, from the relay server 200, relay data regarding the reception task, receiving the relay data from the relay server 200, and storing the relay data in the reception data Dh.

It should be noted that in the process of step 57, if a destination (for example, a destination selected from friend data representing friends of the user) is specified in the transmission data to be transmitted by the transmission task, the task of transmitting the transmission data may be discontinued. Further, in the process of step 57, when the transmission task and the reception task are subjected to the process, user attribute information stored in the user attribute data Di may be transmitted to the relay server 200 every time the communication terminal apparatus 3 accesses the relay server 200. As described above, it may be determined, on the basis of user attributes, whether or not it is necessary to perform the process on the task, or user attributes may be transmitted to the relay server 200. This makes it possible to perform communication control based on the user attributes. This enables communication control between the relay server 200 and a communication terminal apparatus on the basis of a greater variety of conditions.

Next, the CPU 34 determines whether or not the communication terminal apparatus 3 maintains the ability to communicate with the access point (step 58). For example, if the communication terminal apparatus 3 has moved to outside the communication range of the access point, the CPU 34 makes a negative determination in the above step 58. Then, if the CPU 34 has determined that the communication terminal apparatus 3 maintains the ability to communicate with the access point, the CPU 34 returns to the above step 55 and repeats the process thereof. If, on the other hand, the CPU 34 has determined that the communication terminal apparatus 3 is not able to communicate with the access point, the CPU 34 ends the processing of the subroutine.

Referring back to FIG. 12, in step 46, the CPU 34 determines whether or not the processing shown in the flow chart is to be ended. Examples of conditions for ending the processing include: the fact that the user has performed the operation of ending the processing; the fact that the power to the communication terminal apparatus 3 has been turned off; and the like. If the processing is not to be ended, the CPU 34 returns to the above step 41 and repeats the process thereof. If the processing is to be ended, the CPU 34 ends the processing shown in the flow chart.

In FIG. 14, the control section 202 of the relay server 200 determines whether or not a communication terminal apparatus 3 has accessed the relay server 200 (step 91). Then, if the control section 202 has determined that a communication terminal apparatus 3 has accessed the relay server 200, the processing proceeds to step 92. If, on the other hand, the control section 202 has determined that a communication terminal apparatus 3 has not accessed the relay server 200, the control section 202 ends the processing shown in this flow chart.

In step 92, the control section 202 receives a task from the communication terminal apparatus 3 having accessed the relay server 200. Next, the control section 202 analyzes the received task to determine whether or not the received task is the task of requesting the transmission of data from the relay server 200 (that is, a reception task) (step 93). Then, if the control section 202 has determined that the received task is the task of requesting the transmission of data, the processing proceeds to step 94. If, on the other hand, the control section 202 has determined that the received task is not the task of requesting the transmission of data, the processing proceeds to step 99.

In step 94, the control section 202 analyzes the transmission request transmitted from the communication terminal apparatus 3. Then, the control section 202 extracts relay data based on the transmission request from the storage section 203 (step 95), and the processing proceeds to the next step.

For example, on the basis of the access point used by the communication terminal apparatus 3 in the transmission request and the application specified in the transmission request, the control section 202 sets an access point with which relay data to be a transmission target is associated. As an example, if relay data transmitted via the same access point as the access point through which the transmission request has been made is determined as a transmission target, then with reference to the relay data Do, the control section 202 determines, among pieces of relay data managed with respect to the access point, relay data related to the specified application as a transmission target. As another example, if relay data transmitted via an access point belonging to the same group as the access point through which the transmission request has been made or via an access point paired with the access point through which the transmission request has been made is determined as a transmission target, then with reference to the access point group data Dp, the control section 202 extracts such access points belonging to the same group or such paired access points. Then, with reference to the relay data Do, the control section 202 determines, among pieces of relay data managed with respect to the extracted access points, pieces of relay data related to the specified application as transmission targets. Then, the control section 202 determines, among the transmission targets, relay data having the earliest date and time of acquisition, as relay data corresponding to the transmission request.

It should be noted that the control section 202 may further narrow down the transmission targets, taking into account the additional conditions described above. For example, if relay data is selected further in accordance with user attributes, the control section 202 may narrow down pieces of relay data to be the transmission targets on the basis of user attribute information of the communication terminal apparatus 3 transmitted together with the transmission request or user attribute information transmitted from the communication terminal apparatus 3 when transmission data is received. For example, if user attribute information indicating partners from which the user does not receive relay data has been transmitted from the communication terminal apparatus 3 having made the transmission request, the control section 202 stores the user attribute information in the user attribute data Dm and removes from the transmission targets the relay data transmitted from the partners, thereby narrowing down the transmission targets. Further, if user attribute information indicating partners to which the user does not wish to transmit transmission data has been transmitted from the communication terminal apparatus 3 having transmitted relay data to be the transmission targets, the control section 202 removes, if the partners include the user having transmitted the transmission request, relay data related to the user attribute information from the transmission targets, thereby narrowing down the transmission targets.

Next, the control section 202 determines whether or not relay data to be transmitted in accordance with the transmission request has been extracted in the process of step 95 (step 96). Then, if the control section 202 has determined that such relay data has been extracted, the processing proceeds to step 97. If, on the other hand, the control section 202 has determined that no relay data has been be extracted, the processing proceeds to step 98.

In step 97, the control section 202 transmits the extracted relay data to the communication terminal apparatus 3 having made the transmission request, and the processing proceeds to step 99. For example, the control section 202 transmits, to the communication terminal apparatus 3 having made the transmission request, the relay data together with information that can be distinguished by the application that uses the relay data. Then, the control section 202 deletes the transmitted relay data from the relay data Do.

In step 98, the control section 202 transmits, to the communication terminal apparatus 3 having made the transmission request, data indicating that there is no relay data that can be transmitted, and the processing proceeds to step 99. It should be noted that the communication terminal apparatus 3 receives the data, and thereby can notify the user of the communication terminal apparatus 3 that relay data has not been transmitted from the relay server 200. If, however, such notification is not required, the process of step 98 may be skipped.

In step 99, the control section 202 analyzes the received task to determine whether or not the received task is the task of requesting the relay server 200 to receive data (that is, a transmission task). Then, if the control section 202 has determined that the received task is the task of requesting the reception of data, the processing proceeds to step 100. If, on the other hand, the control section 202 has determined that the received task is not the task of requesting the reception of data, the control section 202 ends the processing shown in the flow chart.

In step 100, the control section 202 analyzes the reception request transmitted from the communication terminal apparatus 3, and the processing proceeds to the next step.

It should be noted that in the above step 100, the control section 202 may analyze the reception request, taking into account the additional conditions described above. For example, the control section 202 may analyze whether or not the transmission data for which the reception request has been made is to be acquired, on the basis of the access point used by the communication terminal apparatus 3 in the reception request, the application associated with the transmission data for which the reception request has been made, and the user (the communication ID) having made the reception request. Specifically, with reference to the relay data Do, if, among pieces of relay data managed with respect to the access point used by the communication terminal apparatus 3 in the reception request, pieces of relay data associated with the application of the transmission data for which the reception request has been made include relay data of the user (the communication ID) having made the reception request, the control section 202 determines that the transmission data for which the reception request has been made is not to be acquired. Further, if the application associated with the transmission data for which the reception request has been made is an application not included in those related to pieces of data to be transmitted and received in this communication, the control section 202 may determine that the transmission data for which the reception request has been made is not to be acquired.

Next, on the basis of the result of the analysis in the above step 100, the control section 202 determines whether or not the transmission data for which the reception request has been made is to be acquired (step 101). Then, if the control section 202 has determined that the transmission data is to be acquired, the processing proceeds to step 102. If, on the other hand, the control section 202 has determined that the transmission data is not to be acquired, the processing proceeds to step 103.

In step 102, the control section 202 receives from the communication terminal apparatus 3 the transmission data for which the reception request has been made, and the control section 202 stores the transmission data in the relay data Do. Then, the control section 202 ends the processing shown in the flow chart. For example, on the basis of the access point used by the communication terminal apparatus 3 in the reception request and the specified application, the control section 202 stores as the relay data Do the transmission data for which the reception request has been made. Specifically, if the reception request has been made via the access point A and is a request to receive transmission data related to the application A, the control section 202 determines the transmission data as relay data related to the application A managed with respect to the access point A, and stores the transmission data in association with information (the communication ID) of the user having made the reception request and the date and time of acquisition.

In step 103, the control section 202 transmits, to the communication terminal apparatus 3 having made the reception request, data indicating that the transmission data is not to be received, and the control section 202 ends the processing shown in the flow chart. It should be noted that the communication terminal apparatus 3 receives the data, and thereby can notify the user of the communication terminal apparatus 3 that the relay server 200 has not received the transmission data. If, however, such notification is not required, the process of step 103 may be skipped.

It should be noted that the communication between the relay server 200 and each of the communication terminal apparatuses 3 is described above using the example where data to be transmitted and received is managed with respect to each application. Alternatively, data may be transmitted and received without managing an application that uses the data to be transmitted and received. In this case, even in the relay data Do managed by the relay server 200, it is not necessary to distinguish and manage applications. Thus, relay data based on each of the access points is subjected to first in, first out, regardless of applications.

In addition, the above descriptions are given using the example where a single piece of transmission data and a single piece of relay data are transmitted and received for a single application. Alternatively, another transmission form may be employed. For example, each of the communication terminal apparatuses 3 may collectively transmit a plurality of pieces of transmission data to the relay server 200 for a single application. Yet alternatively, the relay server 200 may collectively transmit a plurality of pieces of relay data to each of the communication terminal apparatuses 3 for a single application.

In addition, the above descriptions are given using the example where in accordance with the transmission of data, the data stored in the transmission source apparatus is deleted. Alternatively, even after the transmission of data, the data may be stored in the transmission source apparatus. As an example, if one of the communication terminal apparatuses 3 has transmitted transmission data to the relay server 200, the same transmission task may continue until the transmission data is transmitted a predetermined number of times, or until a predetermined time elapses since the transmission task has been registered, or until the power to the communication terminal apparatus 3 is turned off. In this case, every time connection is established between one of the communication terminal apparatuses 3 and a new access point, the same transmission data may be transmitted to the relay server 200. As another example, if the relay server 200 has transmitted relay data to one of the communication terminal apparatuses 3, the state where the relay data is stored in the storage section 203 may continue until the relay data is received by a predetermined number of communication terminal apparatuses 3, or until a predetermined time elapses since the relay data has been acquired. In this case, if a plurality of communication terminal apparatuses 3 have accessed the relay server 200 via a certain access point, the same relay data may be transmitted to the communication terminal apparatuses 3.

It should be noted that the above descriptions are given using the example where the communication terminal apparatus 3 and the relay server 200 perform a communication process. Alternatively, another apparatus may perform at least some of the processing steps in the communication process. For example, if the communication terminal apparatus 3 is further configured to communicate with another apparatus (for example, another server, another game apparatus, or another mobile terminal), the other apparatus may cooperate to perform the processing steps in the communication process. Further, a part of the processing performed by the relay server 200 may be performed by the communication terminal apparatus 3 or another apparatus. Another apparatus may thus perform at least some of the processing steps in the communication process, which enables a communication process similar to that described above. Further, the communication process described above can be performed by a processor or the cooperation of a plurality of processors, the processor or the plurality of processors contained in a communication system including at least one information processing apparatus and a server. Further, in the exemplary embodiment, the processing shown in the flow charts described above is performed by the CPU 34 of the communication terminal apparatus 3 and the control section 202 of the relay server 200 executing a predetermined game program. Alternatively, a part or all of the game processing shown in the flow charts may be performed by a dedicated circuit included in the communication terminal apparatus 3 or a dedicated circuit included in the relay server 200.

Here, the above variations make it possible to achieve the exemplary embodiment also by a system form such as cloud computing, or a system form such as a distributed wide area network or a local area network. For example, in a system form such as a distributed local area network, it is possible to execute the above processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the process of each step of the above processing. Thus, it goes without saying that it is possible to achieve the exemplary embodiment by sharing the processing in any manner.

In addition, the processing orders, the setting values, the conditions used in the determinations, and the like that are used in the information processing described above are merely illustrative. Thus, it goes without saying that the exemplary embodiment can be achieved also with other orders, other values, and other conditions.

In addition, the above programs may be supplied to the communication terminal apparatus 3 not only through an external storage medium such as the external memory, but also through a wired or wireless communication link. Further, the program may be stored in advance in a non-volatile storage device included in the communication terminal apparatus 3. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

In addition, the above programs may be supplied to the communication terminal apparatus 3 and the relay server 200 not only through an external storage medium such as an optical disk storage medium or the external memory, but also through a wired or wireless communication link. Further, the program may be stored in advance in a non-volatile storage device included in the communication terminal apparatus 3 and the relay server 200. It should be noted that examples of an information storage medium having stored therein the program may include, as well as CD-ROMs, DVDs, optical disk storage media similar to these, and non-volatile memories, flexible disks, hard disks, magneto-optical disks, and magnetic tapes. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program stored in the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, a communication program, an information processing apparatus, a communication terminal apparatus, a communication system, a communication method, and the like in order, for example, to perform data communication by a novel mechanism.

What is claimed is:

1. A communication system including at least one information processing apparatus, a first communication terminal apparatus, a second communication terminal apparatus, and a third communication terminal apparatus, the first communication terminal apparatus, the second communication terminal apparatus, and the third communication terminal apparatus being capable of communicating with the information processing apparatus, the information processing apparatus comprising:
a first data transmission/reception control unit configured to, if having received access from the first communication terminal apparatus, acquire first identification information that enables identification of a position of the first communication terminal apparatus and transmission data transmitted from the first communication terminal apparatus, and store the first identification information and the transmission data in a storage unit;
a second data transmission/reception control unit configured to, if having received access from the second communication terminal apparatus after the access from the first communication terminal apparatus, acquire second identification information that enables identification of a position of the second communication terminal apparatus and transmission data transmitted from the second communication terminal apparatus, store the second identification information and the transmission data in the storage unit, and on the basis of the second identification information, transmit the transmission data of the first communication terminal apparatus stored in the storage unit to the second communication terminal apparatus; and
a third data transmission/reception control unit configured to, if having received access from the third communication terminal apparatus after the access from the second communication terminal apparatus, acquire third identification information that enables identification of a position of the third communication terminal apparatus and transmission data transmitted from the third communication terminal apparatus, store the third identification information and the transmission data in the storage unit, and on the basis of the third identification information, transmit the transmission data of the second communication terminal apparatus stored in the storage unit to the third communication terminal apparatus.

2. A non-transitory computer-readable storage medium having stored therein a communication program to be executed by a computer included in at least one information processing apparatus capable of communicating with a communication terminal apparatus, the communication program causing the computer to execute:
receiving access from the communication terminal apparatus;
acquiring identification information that enables identification of a position of the communication terminal apparatus from which the access has been received and transmission data from the communication terminal apparatus, and storing the identification information and the transmission data in a storage unit; and
if access has been received from a communication terminal apparatus next and thereafter, acquiring identification information that enables identification of a position of the communication terminal apparatus from which the access has been received next and thereafter and transmission data, storing the acquired identification information and the acquired transmission data in the storage unit, and transmitting the transmission data stored in the storage unit to the communication terminal apparatus from which the access has been received next and thereafter, on the basis of the same identification information as the identification information that enables identification of the position of the communication terminal apparatus from which the access has been received next and thereafter.

3. The non-transitory computer-readable storage medium having stored therein the communication program according to claim 2, wherein
the transmission of the transmission data includes setting, on the basis of a position where the transmission data is received, a condition that is used to select a transmission target from among pieces of transmission data stored in the storage unit and is related to positions where the pieces of transmission data have been transmitted, as a first condition, and
in the transmission of the transmission data, transmission data that satisfies the first condition is transmitted to the communication terminal apparatus from which the access has been received next and thereafter.

4. The non-transitory computer-readable storage medium having stored therein the communication program according to claim 2, wherein
the transmission of the transmission data includes setting, on the basis of information different from the identification information, a second condition for selecting a transmission target from the transmission data stored in the storage unit, and
in the transmission of the transmission data, transmission data that satisfies the second condition is transmitted to the communication terminal apparatus from which the access has been received next and thereafter.

5. The non-transitory computer-readable storage medium having stored therein the communication program according to claim 4, wherein
in the setting of the second condition, the second condition is set on the basis of a user attribute of the communication terminal apparatus having transmitted the transmission data and a user attribute of the communication terminal apparatus to which the transmission data is to be transmitted.

6. The non-transitory computer-readable storage medium having stored therein the communication program according to claim 5, the communication program further causing the computer to execute acquiring transmission rejection information set in the communication terminal apparatus as transmission destination users to which transmission of data is rejected, wherein
in the setting of the second condition, the fact that a user of the communication terminal apparatus to which the transmission data is to be transmitted is not included in the transmission destination users of the transmission rejection information set in the communication terminal apparatus having transmitted the transmission data is set as the second condition.

7. The non-transitory computer-readable storage medium having stored therein the communication program according to claim 5, the communication program further causing the computer to execute acquiring reception rejection information set in the communication terminal apparatus as transmission source users from which reception of data is rejected, wherein
in the setting of the second condition, the fact that a user of the communication terminal apparatus having transmitted the transmission data is not included in the transmission source users of the reception rejection information set in the communication terminal apparatus to which the transmission data is to be transmitted is set as the second condition.

8. The non-transitory computer-readable storage medium having stored therein the communication program according to claim 2, wherein
in the reception of the access, if access has been performed by the same communication terminal apparatus within a predetermined time from a position within a predetermined range with reference to a position of previous access, the access is rejected.

9. The non-transitory computer-readable storage medium having stored therein the communication program according to claim 2, wherein
in the storage of the transmission data, if transmission data acquired from the same communication terminal apparatus as the communication terminal apparatus from which the access has been received is already stored in the storage unit, acquisition of new transmission data from the communication terminal apparatus is rejected.

10. The non-transitory computer-readable storage medium having stored therein the communication program according to claim 2, wherein
in the storage of the transmission data, the transmission data associated with each of a plurality of application is acquired for the application and stored in the storage unit, and
in the transmission of the transmission data, in accordance with a transmission request made for each application, a piece of transmission data associated with the application is selected from the pieces of transmission data stored in the storage unit and is transmitted to the communication terminal apparatus having made the transmission request.

11. The non-transitory computer-readable storage medium having stored therein the communication program according to claim 2, wherein
in the storage of the transmission data, the transmission data and data representing an application associated with the transmission data are acquired together from the communication terminal apparatus from which the access has been received, and are stored in the storage unit, and
in the transmission of the transmission data, if access has been received from the communication terminal apparatus next and thereafter, transmission data related to an application for which the communication terminal apparatus has made a transmission request is extracted from the storage unit on the basis of the identification information, and is transmitted to the communication terminal apparatus.

12. The non-transitory computer-readable storage medium having stored therein the communication program according to claim 2, wherein
in the transmission of the transmission data, if access has been received from the communication terminal apparatus next and thereafter, the transmission data transmitted from a position within a predetermined range with reference to a position of the communication terminal apparatus is transmitted to the communication terminal apparatus.

13. The non-transitory computer-readable storage medium having stored therein the communication program according to claim 2, wherein
in the transmission of the transmission data, if access has been received from the communication terminal apparatus, the transmission data transmitted from a predetermined position set remotely in association with a position of the communication terminal apparatus is transmitted to the communication terminal apparatus.

14. The non-transitory computer-readable storage medium having stored therein the communication program according to claim 2, wherein
the information processing apparatus can communicate with the communication terminal apparatus via any one of a plurality of access points,
in the storage of the transmission data, information that identifies an access point to which the communication terminal apparatus from which the access has been received has been connected is stored as the identification information in the storage unit, and
in the transmission of the transmission data, information that identifies an access point to which the communication terminal apparatus from which the access has been received next and thereafter has been connected is set as the identification information, and the transmission data stored in the storage unit is transmitted on the basis of the information.

15. The non-transitory computer-readable storage medium having stored therein the communication program according to claim 14, the communication program further causing the computer to execute classifying the plurality of access points into groups, wherein
in the transmission of the transmission data, transmission data to be transmitted to the communication terminal apparatus from which the access has been received next and thereafter is selected from transmission data transmitted from an access point belonging to the same group as an access point to which the communication terminal apparatus has been connected.

16. The non-transitory computer-readable storage medium having stored therein the communication program according to claim 14, wherein
in the transmission of the transmission data, transmission data to be transmitted to the communication terminal apparatus from which the access has been received next and thereafter is selected from transmission data transmitted from the same access point as an access point to which the communication terminal apparatus has been connected.

17. The non-transitory computer-readable storage medium having stored therein the communication program according to claim 14, wherein
in the storage of the transmission data, transmission data transmitted from the communication terminal apparatus via a predetermined access point is stored in the storage unit, and
in the transmission of the transmission data, the transmission data is transmitted to the communication terminal apparatus from which the access has been received next and thereafter via the predetermined access point.

18. The non-transitory computer-readable storage medium having stored therein the communication program according to claim 2, wherein
in the storage of the transmission data, if a position of the communication terminal apparatus from which the access has been received is included within a predetermined area, the transmission data is acquired from the communication terminal apparatus and stored in the storage unit, and
in the transmission of the transmission data, if a position of the communication terminal apparatus from which the access has been received next and thereafter is included within the predetermined area, the transmission data stored in the storage unit is transmitted to the communication terminal apparatus.

19. The non-transitory computer-readable storage medium having stored therein the communication program according to claim 2, wherein in the storage of the transmission data, if a position of the communication terminal apparatus from which the access has been received is included within a predetermined area, acquisition of the transmission data from the communication terminal apparatus is rejected, and in the transmission of the transmission data, if a position of the communication terminal apparatus from which the access has been received is included within the predetermined area, transmission of the transmission data to the communication terminal apparatus is rejected.

20. At least one information processing apparatus capable of communicating with a communication terminal apparatus, the information processing apparatus comprising:

an access reception unit configured to receive access from the communication terminal apparatus;

a data storage control unit configured to acquire identification information that enables identification of a position of the communication terminal apparatus from which the access has been received and transmission data from the communication terminal apparatus, and storing the identification information and the transmission data in a storage unit; and a data transmission control unit configured to, if access has been received next and thereafter from the communication terminal apparatus, acquire identification information that enables identification of a position of the communication terminal apparatus from which the access has been received next and thereafter and transmission data, store the acquired identification information and the acquired transmission data in the storage unit, and transmit the transmission data stored in the storage unit to the communication terminal apparatus from which the access has been received next and thereafter, on the basis of the same identification information as the identification information that enables identification of the position of the communication terminal apparatus from which the access has been received next and thereafter.

21. A communication method to be executed by a processor or a cooperation of a plurality of processors, the processor or the plurality of processors contained in a communication system including at least one information processing apparatus, a first communication terminal apparatus, a second communication terminal apparatus, and a third communication terminal apparatus, the first communication terminal apparatus, the second communication terminal apparatus, and the third communication terminal apparatus being capable of communicating with the information processing apparatus, the communication method comprising:

in accordance with access from the first communication terminal apparatus to the information processing apparatus, acquiring first identification information that enables identification of a position of the first communication terminal apparatus and transmission data transmitted from the first communication terminal apparatus, and storing the first identification information and the transmission data in a storage unit;

in accordance with access from the second communication terminal apparatus to the information processing apparatus after the access from the first communication terminal apparatus, acquiring second identification information that enables identification of a position of the second communication terminal apparatus and transmission data transmitted from the second communication terminal apparatus, storing the second identification information and the transmission data in the storage unit, and on the basis of the second identification information, transmitting the transmission data of the first communication terminal apparatus stored in the storage unit to the second communication terminal apparatus; and in accordance with access from the third communication terminal apparatus to the information processing apparatus after the access from the second communication terminal apparatus, acquiring third identification information that enables identification of a position of the third communication terminal apparatus and transmission data transmitted from the third communication terminal apparatus, storing the third identification information and the transmission data in the storage unit, and on the basis of the third identification information, transmitting the transmission data of the second communication terminal apparatus stored in the storage unit to the third communication terminal apparatus.

22. A non-transitory computer-readable storage medium having stored therein a communication program to be executed by a computer included in at least one information processing apparatus capable of communicating with a communication terminal apparatus, the communication program causing the computer to execute:

receiving access from the communication terminal apparatus;

acquiring identification information that enables identification of a position of the communication terminal apparatus from which the access has been received and transmission data from the communication terminal apparatus, and storing the identification information and the transmission data in a storage unit; and if access has been received from the communication terminal apparatus next and thereafter, transmitting the transmission data stored in the storage unit to the communication terminal apparatus on the basis of identification information that enables identification of a position of the communication terminal apparatus; wherein the transmission of the transmission data includes setting, on the basis of information different from the identification information, a second condition for selecting a transmission target from the transmission data stored in the storage unit;

in the transmission of the transmission data, transmission data that satisfies the second condition is transmitted to the communication terminal apparatus from which the access has been received next and thereafter;

in the setting of the second condition, the second condition is set on the basis of a user attribute of the communication terminal apparatus having transmitted the transmission data and a user attribute of the communication terminal apparatus to which the transmission data is to be transmitted;

the communication program further causes the computer to execute acquiring transmission rejection information set in the communication terminal apparatus as transmission destination users to which transmission of data is rejected; and in the setting of the second condition, the fact that a user of the communication terminal apparatus to which the transmission data is to be transmitted is not included in the transmission destination users of the transmission rejection information set in the communication terminal apparatus having transmitted the transmission data is set as the second condition.

23. A non-transitory computer-readable storage medium having stored therein a communication program to be executed by a computer included in at least one information processing apparatus capable of communicating with a communication terminal apparatus, the communication program causing the computer to execute:

receiving access from the communication terminal apparatus;

acquiring identification information that enables identification of a position of the communication terminal apparatus from which the access has been received and transmission data from the communication terminal apparatus, and storing the identification information and the transmission data in a storage unit; and if access has been received from the communication terminal apparatus next and thereafter, transmitting the transmission data stored in the storage unit to the communication terminal apparatus on the basis of identification information that enables identification of a position of the communication terminal apparatus; wherein the transmission of the transmission data includes setting, on the basis of information different from the identification information, a second condition for selecting a transmission target from the transmission data stored in the storage unit;

in the transmission of the transmission data, transmission data that satisfies the second condition is transmitted to the communication terminal apparatus from which the access has been received next and thereafter;

in the setting of the second condition, the second condition is set on the basis of a user attribute of the communication terminal apparatus having transmitted the transmission data and a user attribute of the communication terminal apparatus to which the transmission data is to be transmitted;

the communication program further causes the computer to execute acquiring reception rejection information set in the communication terminal apparatus as transmission source users from which reception of data is rejected; and in the setting of the second condition, the fact that a user of the communication terminal apparatus having transmitted the transmission data is not included in the transmission source users of the reception rejection information set in the communication terminal apparatus to which the transmission data is to be transmitted is set as the second condition.

* * * * *